United States Patent
Hanyu et al.

(10) Patent No.: US 9,111,051 B2
(45) Date of Patent: Aug. 18, 2015

(54) ASYNCHRONOUS PROTOCOL CONVERTER

(75) Inventors: Takahiro Hanyu, Miyagi (JP); Naoya Onizawa, Miyagi (JP)

(73) Assignee: TOHOKU UNIVERSITY, Sendai-shi (JP)

( * ) Notice: Subject to any disclaimer, the term of this patent is extended or adjusted under 35 U.S.C. 154(b) by 334 days.

(21) Appl. No.: 13/700,553

(22) PCT Filed: May 27, 2011

(86) PCT No.: PCT/JP2011/062249
§ 371 (c)(1),
(2), (4) Date: Nov. 28, 2012

(87) PCT Pub. No.: WO2011/149066
PCT Pub. Date: Dec. 1, 2011

(65) Prior Publication Data
US 2013/0073771 A1 Mar. 21, 2013

(30) Foreign Application Priority Data
May 28, 2010 (JP) ................................ 2010-123609

(51) Int. Cl.
*G06F 13/14* (2006.01)
*G06F 13/40* (2006.01)
(Continued)

(52) U.S. Cl.
CPC ........ *G06F 13/4027* (2013.01); *H04L 12/6418* (2013.01); *H04L 25/38* (2013.01)

(58) Field of Classification Search
CPC .......................... H04B 10/299; H04B 2210/517
USPC ........................................................ 710/305
See application file for complete search history.

(56) References Cited

U.S. PATENT DOCUMENTS 3,995,119 A * 11/1976 Pachynski, Jr. ................ 370/505
4,393,493 A * 7/1983 Edwards ........................ 370/228
(Continued)

FOREIGN PATENT DOCUMENTS

JP 2006-254449 A 9/2006

OTHER PUBLICATIONS

Bainbridge, J. et al., "Chain: A Delay-Insensitive Chip Area Interconnect", IEEE Micro, vol. 22, No. 5, p. 16-23, Sep.-Oct. 2002.
(Continued)

*Primary Examiner* — Paul R Myers
(74) *Attorney, Agent, or Firm* — Westerman, Hattori, Daniels & Adrian, LLP

(57) ABSTRACT

An asynchronous protocol converter, which is capable of flexibly carrying out communications between tens of IP cores in an asynchronous protocol Network-on-Chip system, and which is multiple input multiple output is provided. In an LSI (20), which comprises a plurality of IP cores (21), and routers (22) positioned adjacent to the plurality of IP cores (21), an asynchronous protocol converter (1) is positioned between adjacent routers (22). The asynchronous protocol converter (1) is configured to comprise: a two-to-four-phase converter (11) that is connected to an adjacent router (22*a*) within the LSI (20); a four-phase pipelined router (12) that is connected on the output side of the two-to-four-phase converter (11); a four-phase-to-two-phase converter (13) that is connected to the outputs of the four-phase pipelined router (12); an input controller (14) that controls the two-to-four-phase converter (11); and an output controller (15) that controls the four-to-two-phase converter (13).

20 Claims, 25 Drawing Sheets

(51) Int. Cl.
*H04L 25/38* (2006.01)
*H04L 12/64* (2006.01)

(56) References Cited

U.S. PATENT DOCUMENTS

| | | | | |
|---|---|---|---|---|
| 4,947,394 | A * | 8/1990 | Nakajima et al. | 714/712 |
| 6,324,236 | B1 * | 11/2001 | Bladh | 375/375 |
| 6,559,996 | B1 * | 5/2003 | Miyamoto et al. | 398/183 |
| 8,218,448 | B1 * | 7/2012 | Cox et al. | 370/242 |
| 2002/0078328 | A1 * | 6/2002 | Hofstee | 712/220 |
| 2004/0109698 | A1 * | 6/2004 | Kim et al. | 398/199 |
| 2011/0074610 | A1 * | 3/2011 | Garg et al. | 341/69 |

OTHER PUBLICATIONS

Beigne, E. et al., "An asynchronous NOC architecture providing low latency service and its multi-level design framework", Proceedings of the 11th IEEE International Symposium on Asynchronous Circuits and Systems, p. 54-63 (2005).

Dean, M. et al., "Efficient Self-Timing with Level-Encoded 2-Phase Dual-Rail (LEDR)", Advanced Research in VLSI, p. 55-70 (1991).

McGee, P.B. et al., "A Level-Encoded Transition Signaling Protocol for High-Throughput Asynchronous Global Communication", Proceedings of the 14th IEEE International Symposium on Asynchronous Circuits and Systems, p. 116-127 (2008).

Mitra, A. et al., "Efficient Asynchronous Protocol Converters for Two-Phase Delay-Insensitive Global Communication", Proceedings of the 13th IEEE International Symposium on Asynchronous Circuits and Systems, p. 186-195 (2007).

McLaughlin, W.F. et al., "Asynchronous Protocol Converters for Two-Phase Delay-Insensitive Global Communication", IEEE Transactions on Very Large Scale Integration (VLSI) Systems, vol. 17, No. 7, Jul. 2009.

Takahashi Tomohiro, "Study on asynchronous data transfer method and its VLSI implementation based on the control signal multiplexing encoding", Doctoral Thesis of Tohoku University (2006).

* cited by examiner

Prior Art

ASYNCHRONOUS PROTOCOL CONVERTER

TECHNICAL FIELD

The present invention relates to an asynchronous protocol converter. More particularly, the invention relates to an asynchronous protocol converter used in a System-on-a-Chip asynchronously providing communication via routers.

BACKGROUND

The minimum feature size of semiconductor integrated circuits has been miniaturized, reaching the minimum feature size for mass production of 32 nm. Thus, more transistors can be integrated now. Such a large-scale integrated circuit is also called a System LSI.

FIG. 19 is a block diagram illustrating the configuration of the System LSI based on the NOC communication. As shown in FIG. 19, the System LSI (also called a System-on-chip: SoC) 40 is generally composed of many functional processing units (Intellectual Property Cores, called IP cores) 41. Due to the recent miniaturization of the minimum feature size, the SoC 40 is structured so that one chip therein can include integrated IP cores 41 for calculation, digital signal calculation (DSP), and memories. The method for providing communication among these IP cores 41 via routers 42 provided in adjacent to the IP cores 41 and based on packet information is called a Network-on-Chip (NoC).

Each IP core 41 in a single NoC operates at the clock frequency of each IP core 41. In other word, each IP core 41 generally operates at a different clock frequency. The communication among the IP cores 41 is performed by synchronous control or asynchronous control without clocks. For example, synchronous control is used in a computer-bus communication. The synchronous control generally has a low degree of design freedom and requires high power dissipation.

In order to solve the above disadvantage in the conventional synchronous control, the communication among the IP cores 41 has been increasingly carried out by asynchronous control (see Patent Reference 1). It is well known that two methods such as a four-phase encoding (see Non-patent References 1 and 2) and a two-phase encoding (see Non-patent References 3 and 4) are used as a typical asynchronous communication protocol.

First, let us explain the four-phase dual-rail encoding (see Non-patent Reference 5). In the four-phase dual-rail encoding, the continuous time-series "data" are distinguished alternately using two kinds of dual-rail codes that correspond to "data" and "spacer", respectively. The term "phase" means "the number of steps to carry out one data transfer" and the term "rail" means "the number of wires required for transferring one data".

FIG. 20 illustrates the four-phase dual-rail encoding, wherein (A) illustrates an asynchronous data transfer channel model based on the four-phase dual-rail encoding, (B) illustrates the definitions of codes, and (C) illustrates one data-transmission procedure in a data-transfer protocol based on the four-phase dual-rail encoding.

A four-phase dual-rail code is a one hot code in which two wires x and x' (see FIG. 20(A)) are allocated with the logical values "1" and "0" to rise any one of the wires to thereby recognize data arrival. The continuous time-series data stream can be recognized by the insertion of the spacer between the codes corresponding to the data (see FIG. 20(B)).

As shown in FIG. 20(C), one data is transmitted in accordance with the following communication protocol based on the four-phase dual-rail encoding as (1) The transceiver recognizes an acknowledge signal from the receiver, and sends a new data to the receiver.

(2) The receiver detects the new data, and returns an acknowledge signal that the new data has been surely arrived at the receiver.

(3) The transceiver recognizes the acknowledge signal, and sends a "spacer" signal to the receiver.

(4) The receiver detects the "spacer" signal, and returns an acknowledge signal that the "spacer" signal has been surely arrived at the receiver.

As described above, the four-phase dual-rail code requires a set of request-acknowledge procedure for both of data code and spacer code, thus requiring as many as 4 steps to complete a single data transmission (also called completion). Thus, the data transfer requires a long cycle time.

Next, let us explain the two-phase dual-rail encoding (see Non-patent Reference 5).

In the two-phase dual-rail protocol, the "spacer" of the four-phase protocol is omitted for the purpose of providing a higher speed and data called "EVEN" and "ODD" is used.

FIG. 21 illustrates the two-phase dual-rail code, wherein (A) illustrates an asynchronous data transfer channel model based on the two-phase dual-rail encoding, (B) illustrates the definition of the code, and (C) illustrates the procedure for one data transfer in the transfer protocol based on the two-phase dual-rail encoding.

A two-phase dual-rail code is a code in which dual-rail codes, x and x', are allocated with the logical values "1" and "0" to rise any one of the dual-rail codes to thereby recognize data arrival (see FIG. 21(A)).

The two-phase dual-rail code data has two different definitions of an "odd number" and an "even number" (see FIG. 21(B)). Pieces of continuous data are identified based on alternately arranged codes having difference definitions. The data is defined so that only one of the dual-rail codes, x and x', changes at a shift from an "odd number" to an "even number" or a shift from an "even number" to an "odd number". Thus, an effective state can be detected correctly.

As shown in FIG. 21(C), one data transfer in the transfer protocol based on the two-phase dual-rail encoding is performed based on the following procedure.

(1) The transceiver recognizes the inversion of the response signal from the receiver and sends data having a different definition from that of the data to the receiver.

(2) The receiver detects the data having the different definition and sends an inverted response signal to the transceiver.

As described above, the two-phase dual-rail encoding does not require, in contrast with the four-phase dual-rail encoding, the request response processing required due to spacer insertion. Thus, the two-phase dual-rail encoding advantageously requires a procedure of two steps to complete one data transfer.

In recent years, in the four-phase asynchronous communication method, such a link circuit has been designed that uses a four-phase protocol to use a quasi-delay-insensitive logic method (hereinafter referred to as a QDI logic method) to provide the connection between routers (see Non-patent References 1 and 2).

On the other hand, in the two-phase asynchronous communication method, a high-speed asynchronous communication link (see Non-patent Reference 4) has been reported that uses a two-phase protocol (see Non-patent Reference 3). However, the two-phase protocol circuit is disadvantageous in that complicated latch and functional block are required and thus a large area is required, thus causing an increased delay time. Due to this reason, a calculation block such as a router generally uses a four-phase protocol.

An asynchronous protocol converter using a QDI logic method has been suggested (see Non-patent References 6 and 7). A protocol converter is a converter that converts a two-phase protocol to a four-phase protocol or a reverse conversion that converts a four-phase protocol to a two-phase protocol.

FIG. 22 is a block diagram illustrating the configuration of an asynchronous protocol converter 50 using the above QDI logic method. As shown in FIG. 22, the conventional asynchronous protocol converter 50 is composed of: a two-to-four-phase protocol converter 51; a four-phase router 52 connected to this protocol converter 51; a four-to-two-phase protocol converter 53 for converting the four-phase protocol signal output from the four-phase router 52 again to a two-phase protocol signal; and a controller 54.

The four-phase router 52 is configured to include: a routing circuit 52a; an arbitration circuit 52b; and a multiplexer (also may be abbreviated as MUX) circuit 52c. A register 52d is provided between the routing circuit 52a and the arbitration circuit 52b. Similarly, a register 52e is provided between the arbitration circuit 52b and the multiplexer circuit 52c. These registers 52d and 52e are used to increase the communication speed (see Non-patent Reference 1).

FIG. 23 is a timing chart illustrating the operation of a conventional asynchronous protocol converter using the QDI logic method. As shown in FIG. 23, at first, all four-phase signals are low as a spacer. An input phase signal and an output phase signal are a two-phase signal and have the same phase information "even". When a new two-phase input having the phase information "odd" comes, the input phase signal shifts and acknowledges "enable" to become high. As a result, the two-to-four-phase protocol converter 51 generates the "data" for a four-phase protocol. Then, the four-phase router performs the calculation based on the three functional blocks (i.e., the routing circuit 52a, the arbitration circuit 52b, and the multiplexer circuit 52c). After the calculation by the four-phase router 52, the four-to-two-phase protocol converter 53 outputs a new two phase having the phase information "odd".

On the other hand, when the completion is confirmed and the output phase signal changes, then "enable" is confirmed again in order to reset the four-phase router 52 to generate a spacer. At the same time, the two-phase input changes. After the four-phase router 52 is reset, the completion is confirmed again. This means the preparation for the protocol conversion of the input signal of the next two phase.

In the case of the conventional asynchronous protocol converter 50, a new two-phase input signal is encoded after all of the functional blocks of the four-phase router 52 are reset by the decoding of the previous two-phase signals in the four-to-two-phase protocol converter 51.

Thus, the cycle time ($t_{cycle\_conv}$) of the conventional asynchronous protocol converter 50 is the sum of the delay time composed of the two-to-four-phase protocol converter (2p->4p) 51, the functional block of the four-phase pipelined router 52 (i.e., the routing circuit 52a, the arbitration circuit 52b, and the multiplexer circuit 52c), the four-to-two phase protocol converter (4p->2p) 53, and the "data" and "spacer" of the controller 54. Therefore, the cycle time ($t_{cycle\_conv}$) can be obtained by the following equation (1).

[Equation 1]

$$t_{cycle\_conv} = t_{2p \rightarrow 4p} + k \times (t_{fb\_data} + t_{fb\_spacer}) + t_{4p \rightarrow 2p} + t_{2p \rightarrow 4p} + t_{cont\_data} + t_{cont\_data} \quad (1)$$

In the equation, k denotes the number of the stages of the circuit of the router having a pipelined structure. In the case of the four-phase router 52 with the pipelined structure shown in FIG. 23, k=3 is established.

As described above, when the asynchronous four-phase pipelined circuit (e.g., the four-phase router 52) is used together with the conventional protocol converter, the cycle time ($t_{cycle\_conv}$) increases in proportion to the number of stages of the pipelined circuit.

PRIOR TECHNICAL REFERENCE

Patent Reference

Patent Reference 1: JP 2006-254449A

Non-Patent Reference

Non-patent Reference 1: J. Bainbridge, et al., "A Delay-Insensitive Chip Area Interconnect", IEEE, Micro, vol. 22, no. 5, September-October 2002. pp. 16-23.

Non-patent Reference 2: E. Beigne, et al., "An asynchronous NoC architecture providing low latency service and its multi-level design framework", Proc. 11th IEEE Int. Symp. Asynchronous Circuits Syst., pp. 54-63, 2005.

Non-patent Reference 3: M. Dean, et al., "Efficient Self-Timed Level-Encoded 2-Phase Dual-Rail (LEDR)", Adv. Res. in VLSI, pp. 55-70, 1991.

Non-patent Reference 4: P. B. McGee, et al., "A Level-Encoded Transition Signaling Protocol for High-Throughput Asynchronous Global Communication", Proc. 14th IEEE Int. Symp. Asynchronous Circuits Syst., pp. 116-127, April 2008.

Non-patent Reference 5: Doctoral thesis of Tohoku University, by Dr. Takahashi Tomohiro, Heisei 18 Nendo (2006).

Non-patent Reference 6: A. Mitra, et al., "Efficient Asynchronous Protocol Converters for Two-Phase Delay-Insensitive Global Communication", Proc. IEEE Int. Symp. Asynchronous Circuits Syst., pp. 186-195, March 2007.

Non-patent Reference 7: W. F. McLaughlin, et al., "Asynchronous Protocol Converters for Two-Phase Delay-Insensitive Global Communication", IEEE Trans. Very Large Scale Integration (VLSI) Systems, vol. 17, no. 7, pp. 923-928, July 2009.

SUMMARY OF THE INVENTION

Problem to be Solved by the Invention

The protocol converter connected to the input/output port of the conventional asynchronous arithmetic unit was commonly connected to the input/output port. First, the protocol of the input data sent to the arithmetic unit is converted and the specific calculation is performed by the arithmetic unit. Then, the protocol of the output data is converted. After the completion of the conversion of the protocol of the output data is confirmed, one processing is completed. Due to the need to sequentially perform this processing, a one-input-and-one-output arithmetic unit has been the only apparatus that can use the conventional converter.

As described above, the arithmetic unit that could be used in the conventional circuit was limited to the one-input and one-output arithmetic unit. Thus, the conventional circuit could not be used in a router having multiple inputs and multiple outputs.

A router and a data transfer link, which are components of a conventional network-on-chip (NoC), could use only one type of protocol. This has caused a disadvantage in which a data transfer link must use a protocol having a long latency time, thus causing a significantly reduced transfer rate of the NoC.

In view of the above situation, it is an objective of the present invention to flexibly perform, in an asynchronous LSI (e.g., a network on-chip), the communication among few dozens of Intellectual Property (IP) cores and to provide a multiple input and multiple output asynchronous protocol converter.

Means for Solving the Problem

In order to achieve the above objective, the asynchronous protocol converter of the present invention is provided between neighboring routers in an LSI including a plurality of IP cores and a router provided adjacent to the plurality of IP cores. The asynchronous protocol converter includes: a two-to-four-phase converter connected to the neighboring routers in the LSI; a pipelined router connected to the output side of the two-to-four-phase converter; a four-to-two-phase converter connected to an output of the four-phase pipelined router; an input controller for controlling the two-to-four-phase converter; and an output controller for controlling the four-to-two-phase converter.

Another embodiment of the present invention is an asynchronous protocol converter provided between neighboring routers in an LSI including a plurality of IP cores and a router provided adjacent to the plurality of IP cores, comprising: a two-to-four-phase converter connected to the neighboring routers in the LSI; a four-phase pipelined router connected to the output side of the two-to-four-phase converter; a four-to-two-phase converter connected to an output of the four-phase pipelined router; an input controller for controlling the two-to-four-phase converter; and an output controller for controlling the four-to-two-phase converter, wherein the two-to-four-phase converter is comprised: a two-phase completion detector connected to the router; and a four-phase encoder for receiving an output from the two-phase completion detector, and the four-to-two-phase converter is comprised: a four-phase decoder connected to an output of the four-phase pipelined router; and a two-phase completion detector for receiving an output from the four-phase decoder.

In the above configuration, the input controller preferably has the following state transitions:

(a) In the initial status, the status of signal in_phase is high (High), and similarly, the status of signal in_completion is low (Low);

(b) The signal in_enable rises and the status is high (High);

(c) When the signal in_enable rises, then the signal in_true (false) showing true ("1") or false ("0") rises and the status is high (High);

(d) When the signal in_true (false) is input, then the signal in_completion rises and the status is high (High);

(e) When the signal in_completion rises, then the signal ack_left rises and the status is high (High);

(f) When the signal ack_left rises, then signal in_enable falls and the status is low (Low) and the signal Input (EVEN) is input;

(g) When the signal in_enable falls, then the signal in_true (false) falls and the status is low (Low);

(h) When the signal in_true (false) falls, the signal in_completion falls and the status is low (Low);

(i) When the signal Input (EVEN) is applied, then the signal in_phase falls and the status is low (Low);

(j) When the signal in_phase falls and the signal in_completion falls, then signal in_enable rises and the status is high (High);

(k) When the signal in_enable rises, then the signal in_true (false) rises and the status is high (High);

(l) When the signal in_true (false) rises, then the signal_in completion rises and the status is high (High);

(m) When the signal in_completion rises, then the signal ack_left falls and the status is low (Low);

(n) When the signal ack_left falls, then the signal in_enable falls and the status is low (Low) and the signal Input (ODD) is input;

(o) When the signal Input (ODD) is input, then the signal in_phase rises and the status is high (High) and returns to the initial status;

(p) When the signal in_enable falls, then the signal in_true (false) falls and the status is low (Low); and q) When the signal in_true (false) falls, then the signal in_completion falls and the status is low (Low) and returns to the initial status.

The input controller is preferably comprised of an asynchronous D latch and an XOR circuit.

The output controller preferably has the following state transitions:

(a) In the initial status, the signal out_true (false) rises and the status is high (High);

(b) When the signal out_true (false) rises, then the signal out_completion rises and the status is high (High) and the signal Output (ODD) is input;

(c) When the signal Output (ODD) is input, then the signal out_phase rises and the status is high (High);

(d) When the signal out_phase rises, then the signal ark_right rises and the status is high (High);

(e) When the signal out_phase and the signal out_completion rise, then the signal out_enable falls and the status is low (Low). When the signal out_enable falls, then the signal out_true (false) falls and the status is low (Low);

(f) When the signal out_true (false) falls, then the signal out_completion falls and the status is low (Low);

(g) When the signal out_completion falls and when the signal ack_right rises, then the signal out_enable rises and the status is high (High);

(h) When the signal out_enable rises, then the signal out_true (false) rises and the status is high (High);

(i) When the signal out_true (false) rises, then the signal Output (EVEN) is output and the signal out_completion rises and the status is high (High);

(j) When the signal Output (EVEN) is output, then the signal out_phase falls and the status is low (Low);

(k) When the signal out_phase falls and when the signal out_completion rises, then the signal out_enable falls and the status is low (Low). When the signal out_enable falls, then the signal out_true (false) falls and the status is low (Low);

(l) When the signal out_true (false) falls, then the signal out_completion falls and the status is low (Low);

(m) When the signal out_completion falls and the signal ack_right falls, then the signal out_enable rises and the status is high (High); and (n) When the signal out_enable rises, then the signal out_true (false) rises and the status is high (High) and returns to the initial status.

The output controller is preferably comprised: an asynchronous D latch; an XOR circuit; and a C element.

The four-phase pipelined router is preferably comprised: a four-phase functional block; a pipeline register; and a four-phase completion detector.

The four-phase pipelined router is preferably configured to comprise: a routing circuit; an arbitration circuit connected to the routing circuit; and a multiplexer circuit connected to the arbitration circuit.

Effect of the Invention

According to the asynchronous protocol converter of the present invention, the use of a multiple input and multiple output protocol converter allows suitable protocols to be independently used for a router and the data transfer, thus realizing a high-speed NoC.

Figure 1:
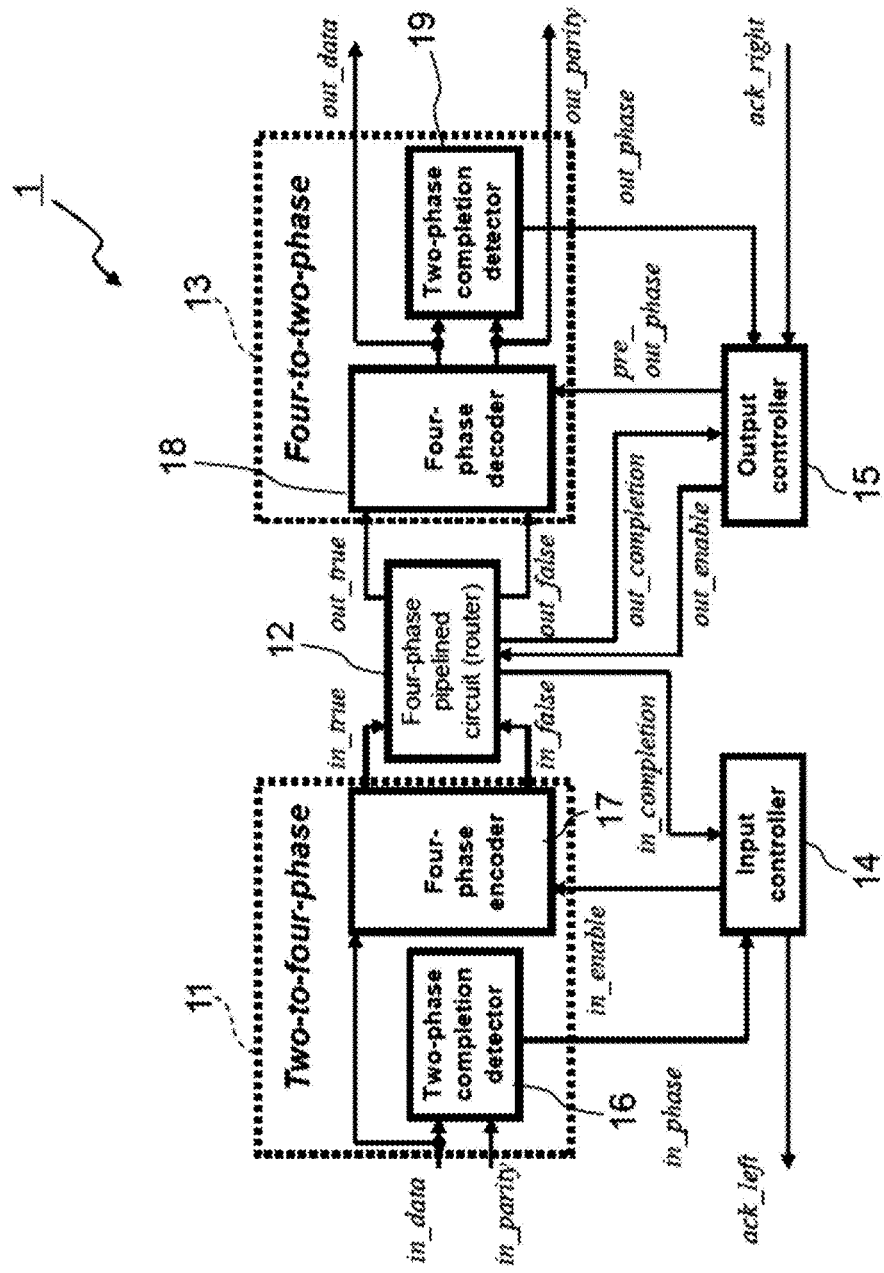
FIG. 1 is a block diagram illustrating the configuration of an asynchronous protocol converter according to an embodiment of the present invention.

DESCRIPTION OF CODES 1, 30: Asynchronous protocol converter
11, 31: Two-to-four-phase converter
12, 32: Four-phase pipelined router
12a, 12b, . . . , 12k: Four-phase functional block
12p: Pipeline register
12q: Four-phase completion detector
12r, 12s: NOR circuit
12t, 12u, 15a, 16r: C element
13: Four-to-two-phase converter
14, 34: Input controller
14a, 14b, 15c, 15d, 15e: Asynchronous D latch
14c, 15b, 16a, 16b, 16n: XOR circuit
15, 35: Output controller
16: Two-phase completion detector
16p, 17b, 17c, 18b, 18c, 18d, 18e: AND circuit
16q, 18f, 18g: OR circuit
17: Four-phase encoder
17a, 18a: NOT circuit
18: Four-phase decoder
18h, 18i: Asynchronous RS latch
19: Two-phase completion detector
20: System LSI
21: IP core
22: Router
32: Three stages configuration pipelined router
36: Routing circuit
37: Arbitration circuit
38: Multiplexer circuit

MODE FOR CARRYING OUT THE INVENTION

The following section will describe an embodiment of the present invention with reference to the drawings.

FIG. 1 is a block diagram illustrating the configuration of the asynchronous protocol converter 1 according to an embodiment of the present invention. As shown in FIG. 1, the asynchronous protocol converter 1 according to an embodiment of the present invention is composed of: the two-to-four-phase converter 11 connected to neighboring routers in the LSI; the four-phase pipelined router 12 connected to the output side of the two-to-four-phase converter 11; the four-to-two-phase converter 13 connected to the output of the four-phase pipelined router 12; the input controller 14 for controlling the two-to-four-phase converter 11 etc.; and the output controller 15 for controlling the four-to-two-phase converter 13 etc.

Figure 2:
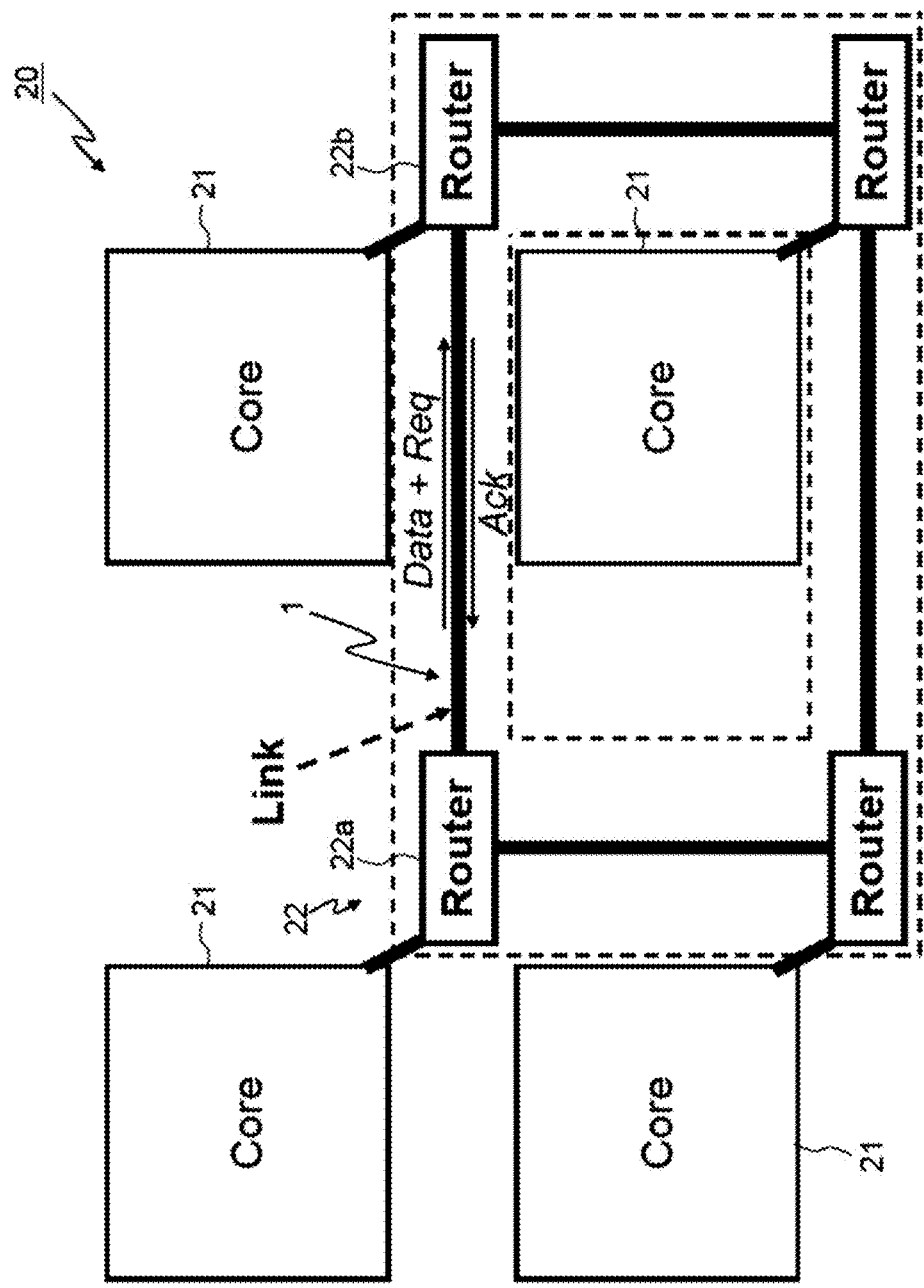
FIG. 2 is a block diagram illustrating the configuration of the LSI including the asynchronous protocol converter of the present invention.

FIG. 2 is a block diagram illustrating a partial configuration of the system LSI 20 in which the asynchronous protocol converter 1 of the present invention is provided. As shown in FIG. 2, the provided LSI 20 is configured to include: a plurality of IP cores 21; the router 22 provided adjacent to the plurality of IP cores 21; and the asynchronous protocol converter 1 of the present invention. The asynchronous protocol converter 1 is structured so that an input data signal and an input parity signal are input from the router 22a adjacent thereto at the left side. Then, the asynchronous protocol converter 1 outputs an output data signal and an output parity signal to the router 22b adjacent thereto at the right side.

The input controller 14 outputs an input acknowledgement signal (ack_left) to the router 20 adjacent thereto at the left side. Then, the output controller 15 receives an output acknowledgement signal (ack_right) from the router 21 adjacent thereto at the right side.

The two-to-four-phase converter 11 is composed of: the two-phase completion detector 16 connected to the router 20 at the exterior of the asynchronous protocol converter 1; and the four-phase encoder 17 that receives the output from the two-phase completion detector 16.

Figure 3:
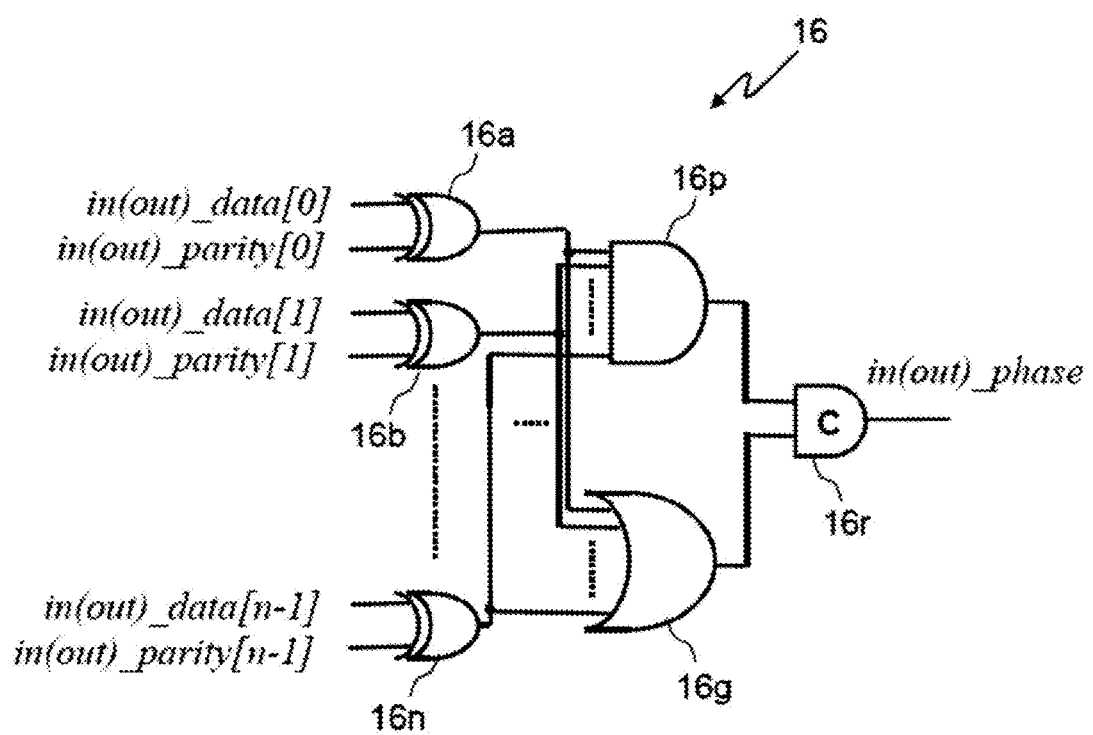
FIG. 3 is a circuit diagram illustrating the configuration of a two-phase completion detector.

FIG. 3 is a circuit diagram illustrating the configuration of the two-phase completion detector 16. As shown in FIG. 3, the two-phase completion detector 16 is composed of: an exclusive OR circuit (called XOR circuit) 16a, 16b, . . . , and 16n connected to the input 0 to n−1, an AND circuit (called AND circuit) 16p that receives all of the outputs from the XOR circuit 16a, 16b, . . . , and 16n; an OR circuit (called an OR circuit) 16q that receives all of the outputs from the XOR circuit 16a, 16b, . . . , and 16n; and a C element 16r that receives the outputs from the AND circuit 16p and the OR circuit 16q. Logic circuits such as the XOR circuit etc. are also called the XOR circuit gate etc.

Figure 4:
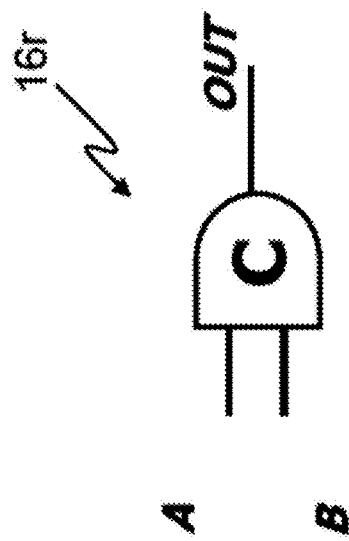
FIG. 4 illustrate the operation of a C element, wherein (A) is a circuit diagram illustrating the configuration of the C element and (B) illustrates a truth value table of the operation of the C element.

FIG. 4 illustrate the operation of the C element 16r, wherein (A) is a circuit diagram illustrating the configuration of the C element 16r and (B) illustrates the true value table of the operation of the C element 16r. As shown in FIG. 4(A), the C element 16r is a bistable storage element used for an asynchronous circuit and is also called a rendezvous circuit or a join circuit. As shown in FIG. 4(B), when all inputs are logic "1", then the output is logic "1". When all inputs are logic "0", then the output is logic "0". When the input includes both of logics "1" and "0", then the last output is maintained.

Figure 5:
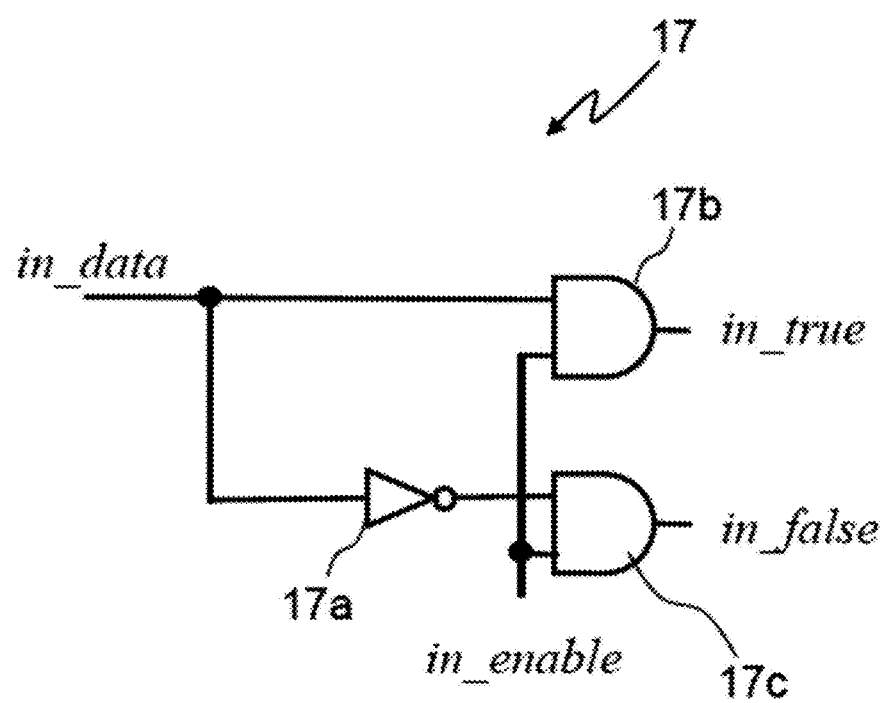
FIG. 5 is a circuit diagram illustrating the configuration of a four-phase encoder.

FIG. 5 is a circuit diagram illustrating the configuration of the four-phase encoder 17. As shown in FIG. 5, the four-phase encoder 17 is composed of: one NOT circuit (called a NOT circuit or an inverter) 17a; and two AND circuits 17b and 17c.

Figure 6:
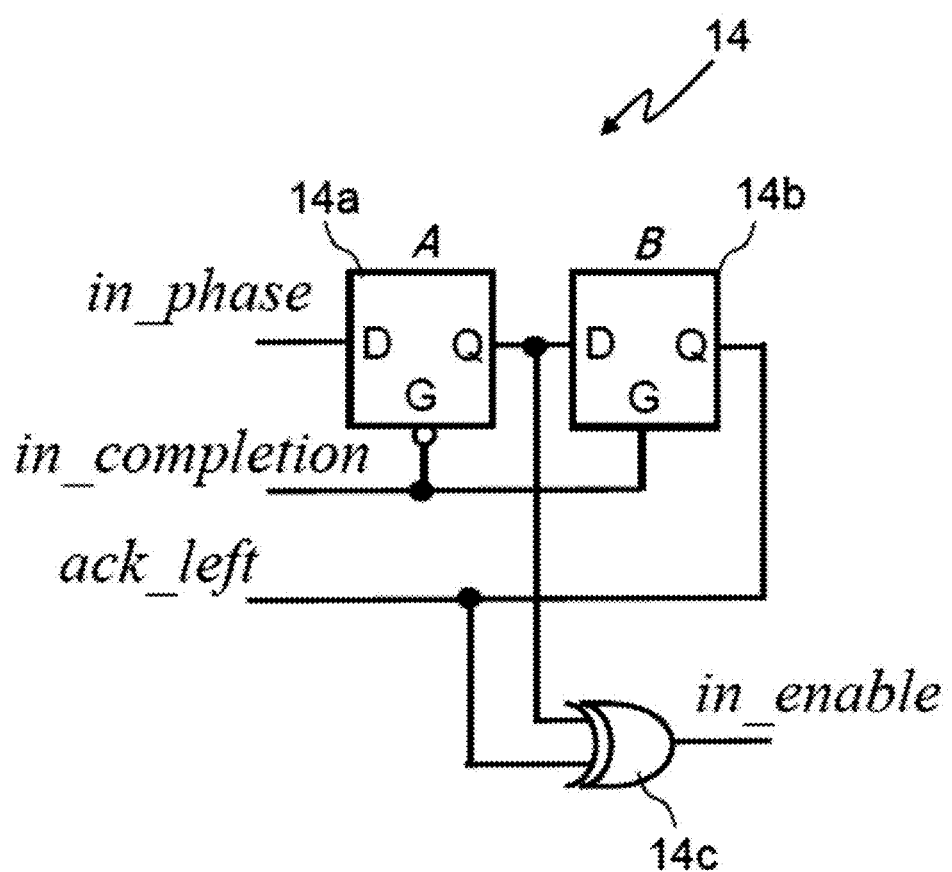
FIG. 6 is a circuit diagram illustrating the configuration of an input controller.

FIG. 6 is a circuit diagram illustrating the configuration of the input controller 14. As shown in FIG. 6, the input controller 14 is composed of: the first and second asynchronous D latches 14a and 14b; and one XOR circuit 14c.

Figure 7:
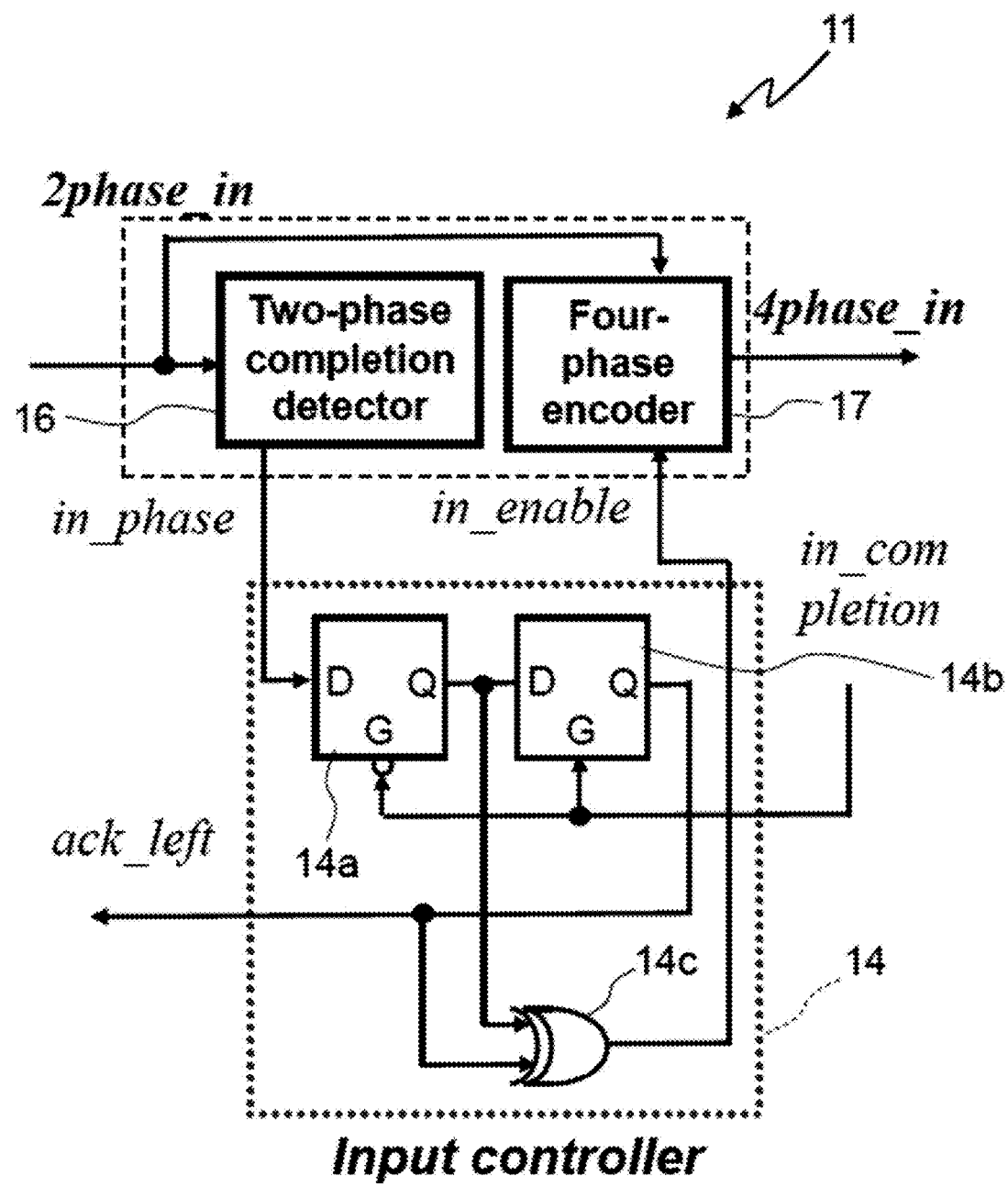
FIG. 7A is a circuit diagram illustrating a two-to-four-phase converter and an input controller.
FIG. 7B is a time chart illustrating the operation of the input controller.
Figure 7:
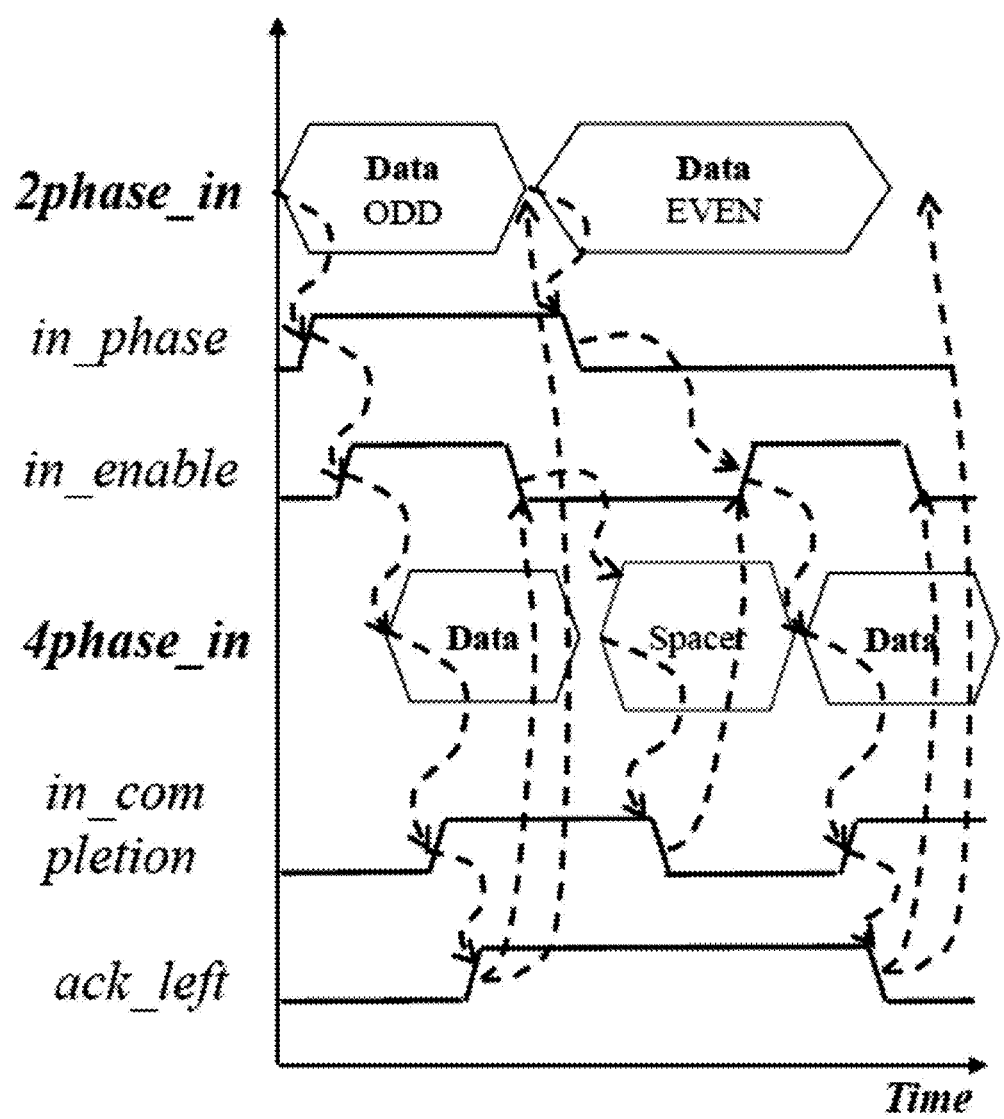

FIG. 7A is a circuit diagram illustrating the two-to-four-phase converter 11 and the input controller 14. FIG. 7A collectively illustrates the two-to-four-phase converter 11 as shown in FIG. 1 and the input controller 14 as shown in FIG. 6.

FIG. 7B is a time chart illustrating the operation of the input controller 14. In FIG. 7B, the horizontal axis shows time (arbitrary unit) and the vertical axis shows, in an order from the above, the two-phase input signal (2phase_in), the input phase signal (in_phase), the input enable signal (in_enable), the four-phase input signal (4phase_in), the input completion signal (in_completion), and the input side acknowledgement signal (ack_left).

As shown in FIG. 7B, when the input completion signal is low (Low), the two-phase input signal (2phase_in) passes the asynchronous D latch 14a. On the other hand, the preceding two-phase input signal is retained or stored by the asynchronous D latch 14b. The XOR circuit 14c determines a phase signal change in order to cause a change of the input enable signal (in_enable) for four-phase calculation. Specifically, when the input enable signal (in_enable) is high (High), the four-phase arithmetic operation is carried out.

When the input completion signal (in_completion) is high (High), then the next protocol conversion of the input phase signal (2phase_in) is stored as the current phase signal to an input in the asynchronous D latch 14b. Specifically, when the input enable signal (in_enable) is low (Low), the four-phase arithmetic operation is reset.

Next, the input acknowledgement signal (ack_left) changes in order to receive the next two-phase input signal.

Figure 8:
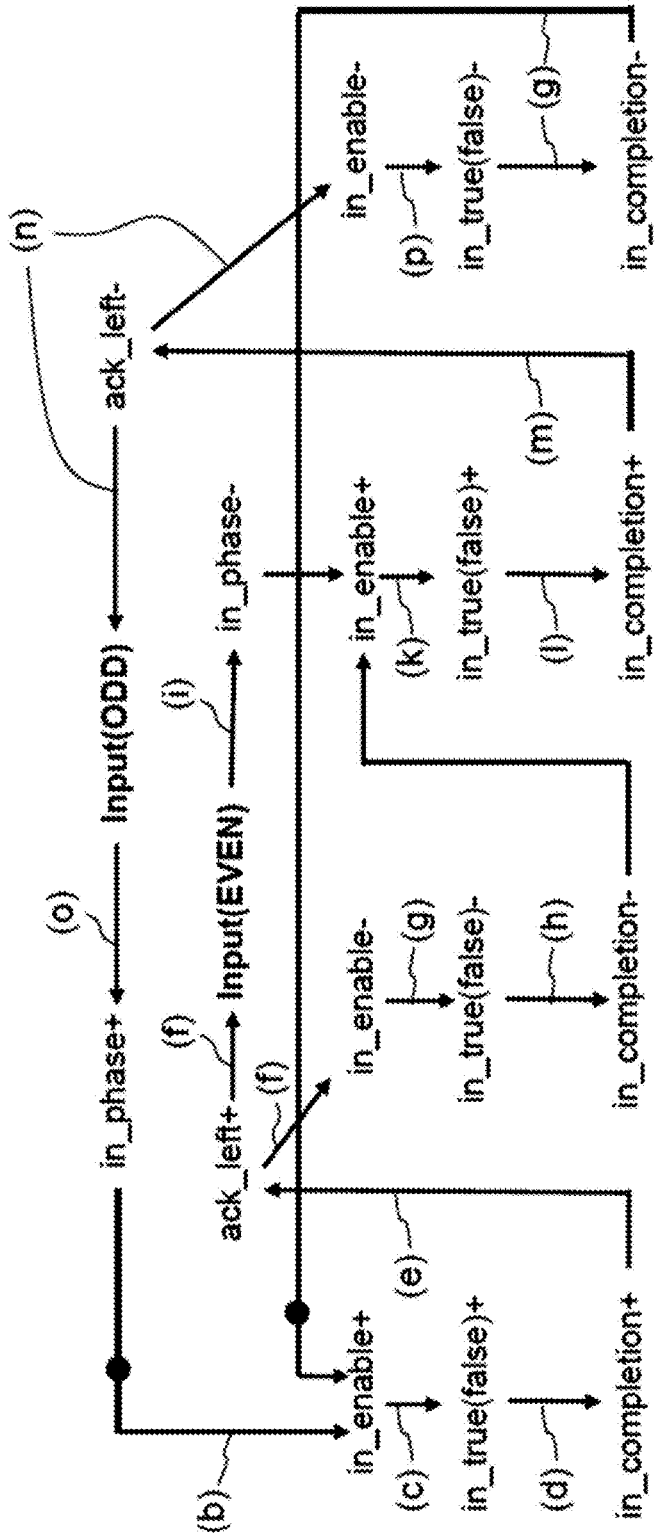
FIG. 8 is a state transition diagram illustrating the operation of the input controller.

FIG. 8 is a state transition diagram illustrating the operation of the input controller 14. First, the following section will describe a method of expressing the state transition diagram.

(1) In FIG. 8, the marks "+" or "−" following signal names show whether the signals rise or fall. For example, "in_enable+" shows that the signal in_enable rises and the status thereof is high (High).

(2) The black circle mark (●) shows the current status (i.e., the initial status). For example, the black circle marks in FIG. 8 show that "in_enable−" and "in_phase+" are in the initial status.

(3) When the arrows input to the signal names (e.g., in_enable+) are all set with the black circle marks (●), then the black circle mark (●) (i.e., the initial status) moves to the output of the signal name. For example, in FIG. 8, in the initial status, the inputs of "in_enable+" all have the black circle marks (●) and thus the black circles move to the outputs thereof.

(4) When an output of a signal name has two or more branches, it means that a plurality of states are generated. For example, in FIG. 8, "ack_left+" generates "in_enable−" and "Input (EVEN)" signals.

As shown in FIG. 8, the operation of the input controller 14 has a state transition as shown below. In the following description, the above marks + and − added to the respective signals shift to a high or low status after a predetermined delay time. Thus, the statuses of the respective signals will be described by a shifted status (i.e., high (High) or low (Low)) and the above marks + and − added to the respective signals are omitted.

(a) In the initial status, the status of the signal in_phase is high (High). Similarly, the status of the signal in_completion is low (Low).

(b) The signal in_enable rises and the status is high (High).

(c) When the signal in_enable rises, the true ("1") or false ("0") signal in_true (false) rises and the status thereof is high (High).

(d) When the signal in_true (false) is input, then the signal in_completion rises and the status is high (High).

(e) When the signal in_completion rises, then the signal ack_left rises and the status is high (High).

(f) When the signal ack_left rises, then the signal in_enable falls and the status is low (Low) and the signal Input (EVEN) is applied.

(g) When the signal in_enable falls, the signal in_true (false) falls and the status is low (Low).

(h) When the signal in_true (false) falls, the signal in_completion falls and the status is low (Low).

(i) When the signal Input (EVEN) is input, the signal in_phase falls and the status is low (Low).

(j) When the signal in_phase falls and the signal in_completion falls, the signal in_enable rises and the status is high (High).

(k) When the signal in_enable rises, then the signal in_true (false) rises and the status is high (High).

(l) When the signal in_true (false) rises, the signal in_completion rises and the status is high (High).

(m) When the signal in_completion rises, the signal ack_left falls and the status is low (Low).

(n) When the signal ack_left falls, then the signal in_enable– falls and the status is low (Low) and the signal Input (ODD) is input.

(o) When the signal Input (ODD) is input, then the signal in_phase rises and the status is high (High) and returns to the initial status.

(p) When the signal in_enable falls, then the signal in_true (false) falls and the status is low (Low).

(q) When the signal in_true (false) falls, then the signal in_completion falls and the status is low (Low) and returns to the initial state.

Figure 9:
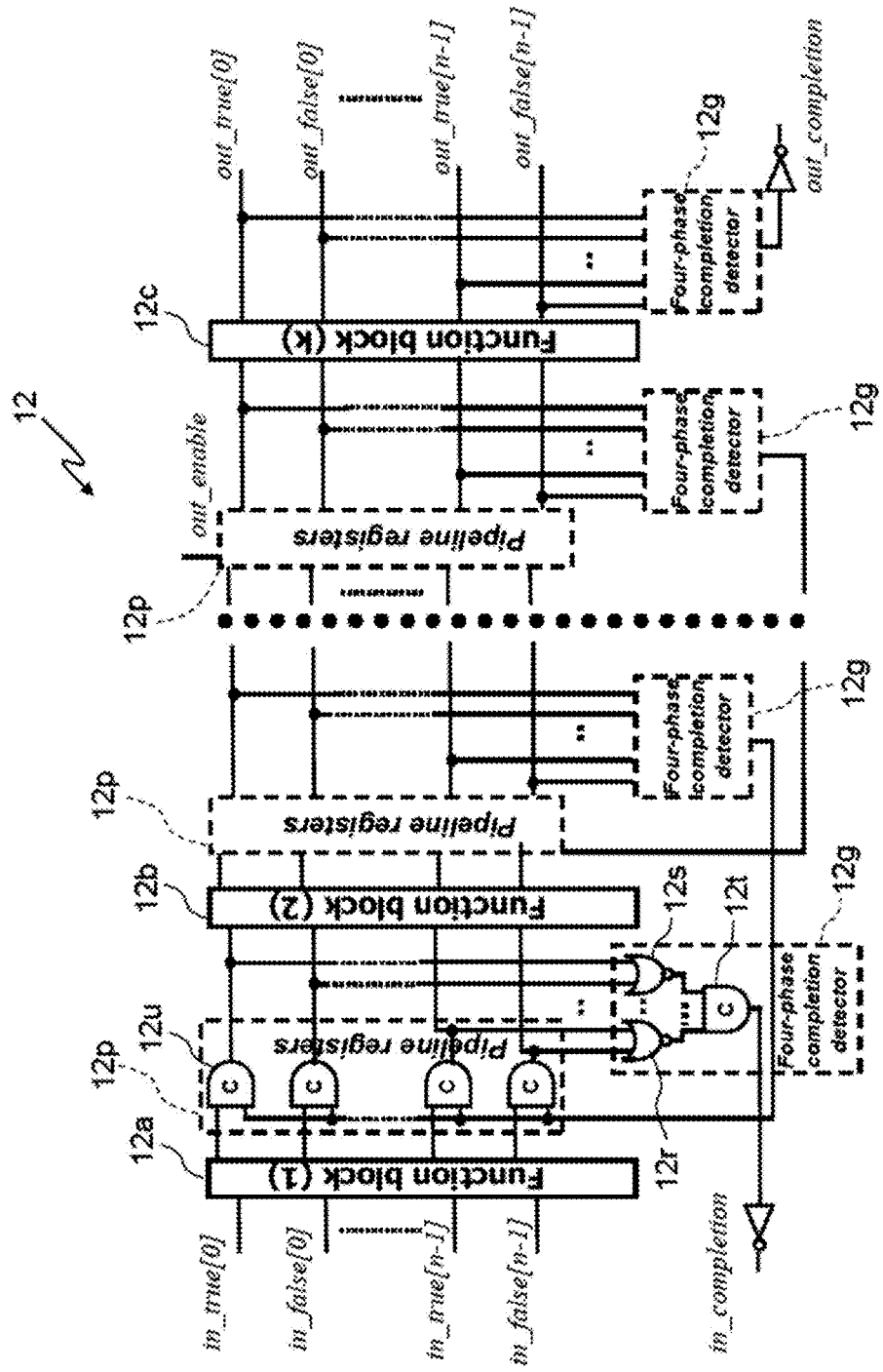
FIG. 9 is a circuit diagram illustrating the configuration of a four-phase pipelined router.

FIG. 9 is a circuit diagram illustrating the configuration of the four-phase pipelined router 12. As shown in FIG. 9, the four-phase pipelined router 12 is configured to include: a plurality of four-phase functional blocks 12a, 12b, . . . , and 12k; the pipeline register 12p; and the four-phase completion detector 12q. The four-phase completion detector 12q is composed of a tree of the NOR circuits 12r and 12s and the C element 12t. The pipeline register 12p composed of a plurality of C elements 12u is controlled by the four-phase completion detector 12q provided in the next stage.

The input completion signal of the input-side is high (High) when the functional block 12a of the initial stage of the four-phase pipelined router 12 is completed. Then, the input completion signal of the input-side is low (Low) when the functional block 12a of the initial stage of the four-phase pipelined router 12 is reset. On the other hand, the output completion signal of output-side is high (High) when the functional block 12c of the final stage of the four-phase pipelined router 12 is completed. Then, the output completion signal of output-side is low (Low) when the functional block 12c of the final stage of the four-phase pipelined router 12 is reset.

The four-to-two-phase converter 13 is composed of: the four-phase decoder 18 connected to the four-phase pipelined router 12; and the two-phase completion detector 19 for receiving an output from the four-phase decoder 18.

Figure 10:
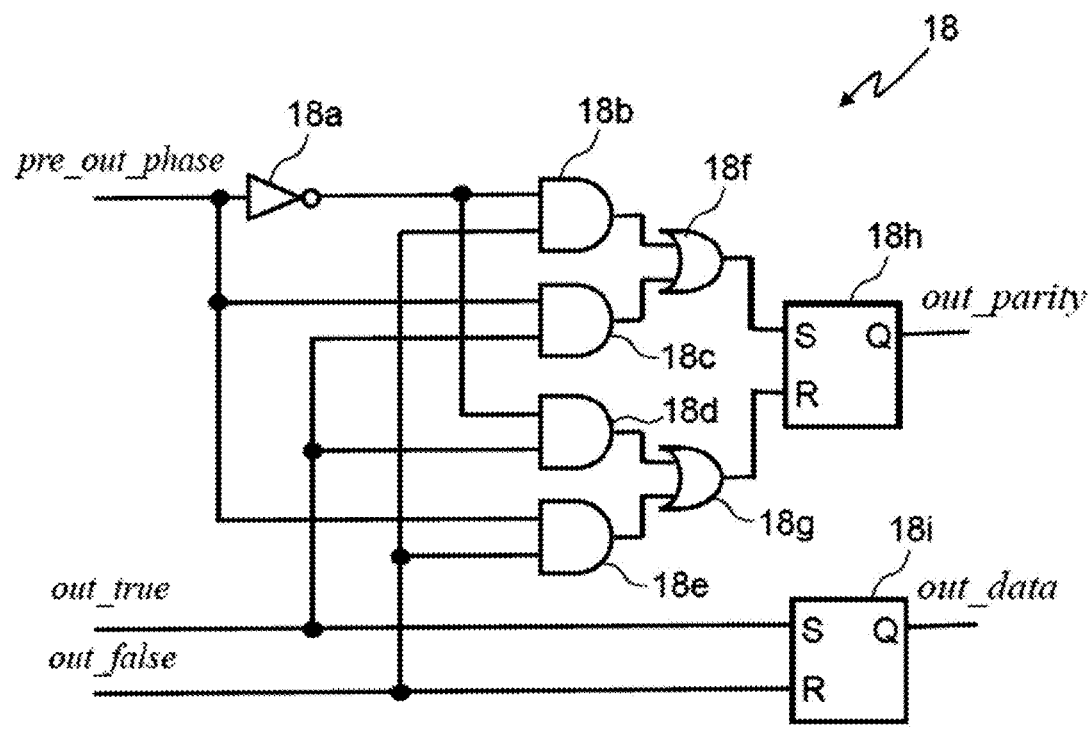
FIG. 10 is a circuit diagram illustrating the configuration of a four-phase decoder.

FIG. 10 is a circuit diagram illustrating the configuration of the four-phase decoder 18. As shown in FIG. 10, the four-phase decoder 18 is composed of: one NOT circuit 18a; four AND circuits 18b, 18c, 18d, and 18e; two OR circuits 18f and 18g; and two asynchronous RS latches 18h and 18i.

The two-phase completion detector 19 for receiving an output from the four-phase decoder 18 has the same configuration as that of the input-side two-phase completion detector 16.

Figure 11:
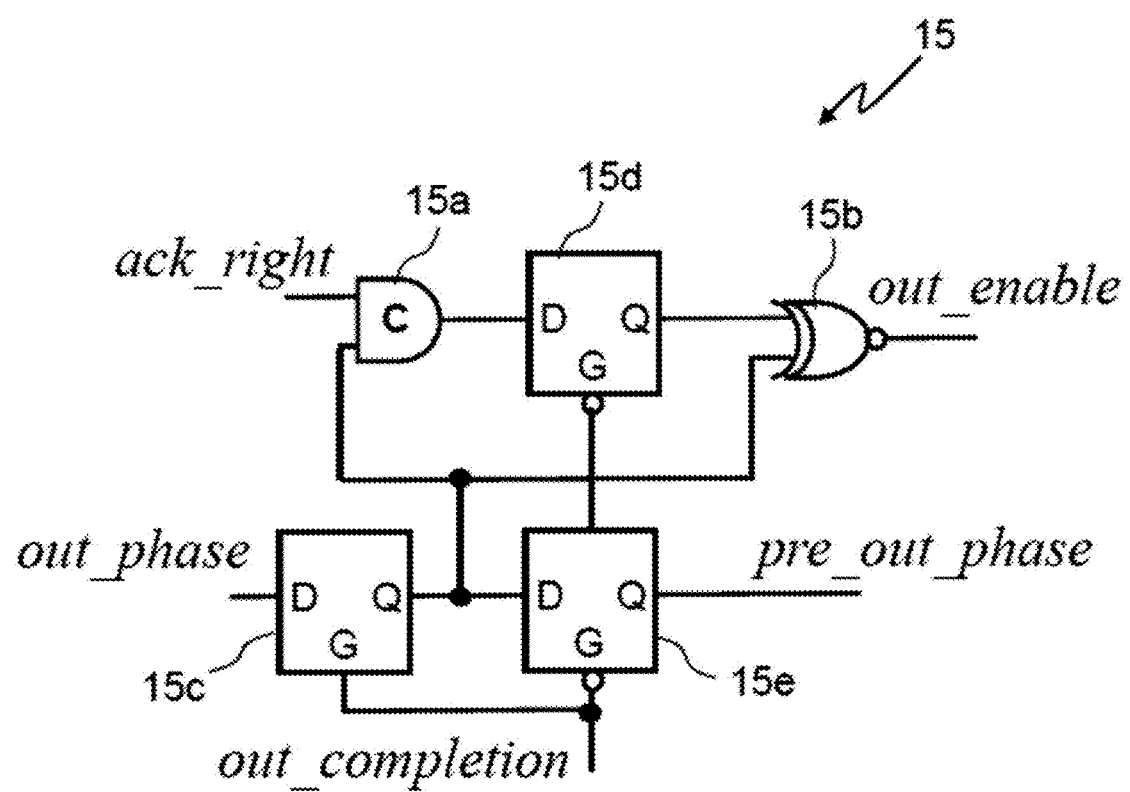
FIG. 11 is a circuit diagram illustrating the configuration of an output controller.

FIG. 11 is a circuit diagram illustrating the configuration of the output controller 15. As shown in FIG. 11, the output controller 15 is composed of: one C element 15a; three asynchronous D latches 15c, 15d, and 15e; and one XOR circuit 15b.

Figure 12:
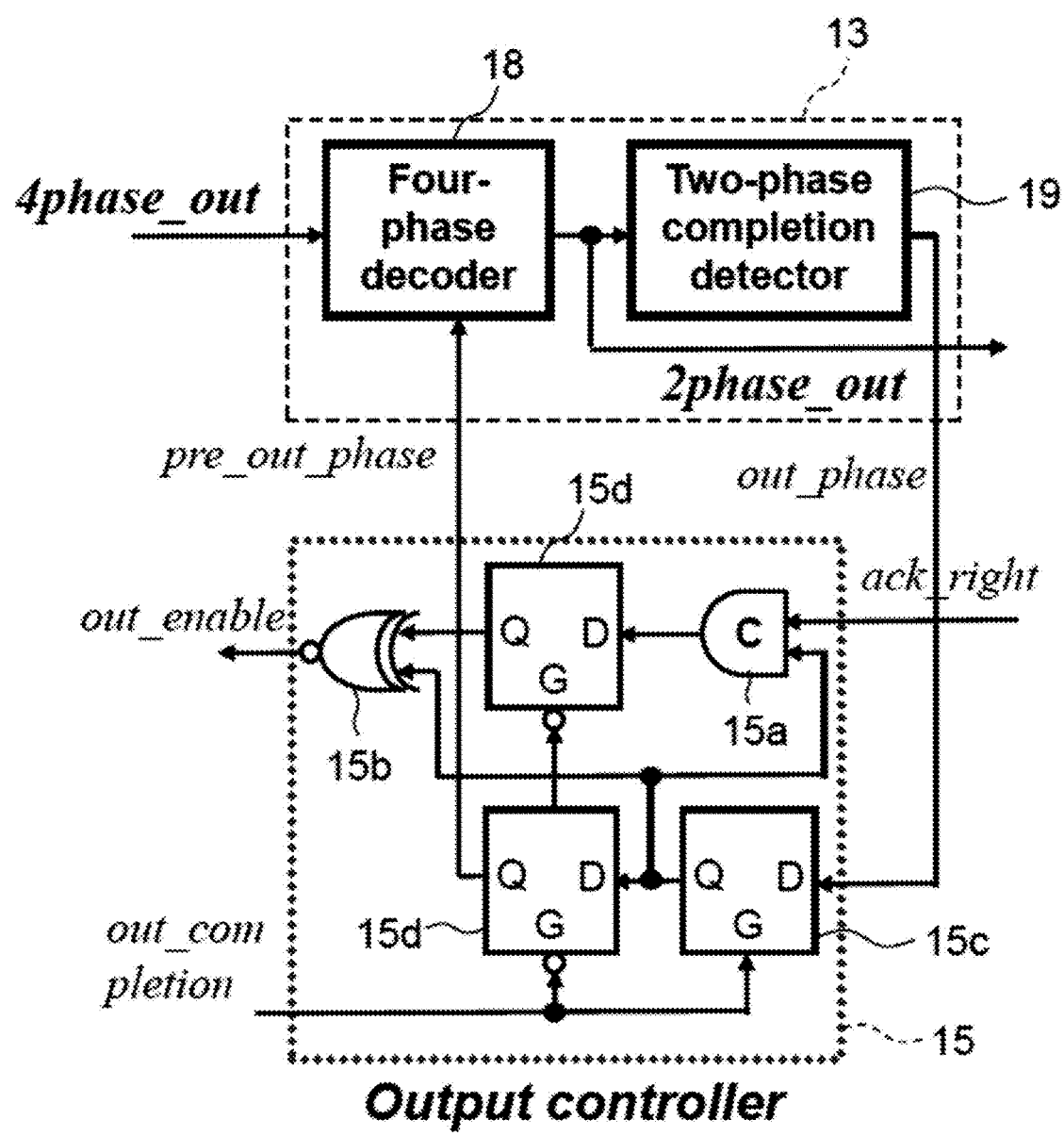
FIG. 12A is a circuit diagram illustrating the four-to-two-phase converter and the output controller.
FIG. 12B is a time chart illustrating the operation of the four-to-two-phase converter.
Figure 12:
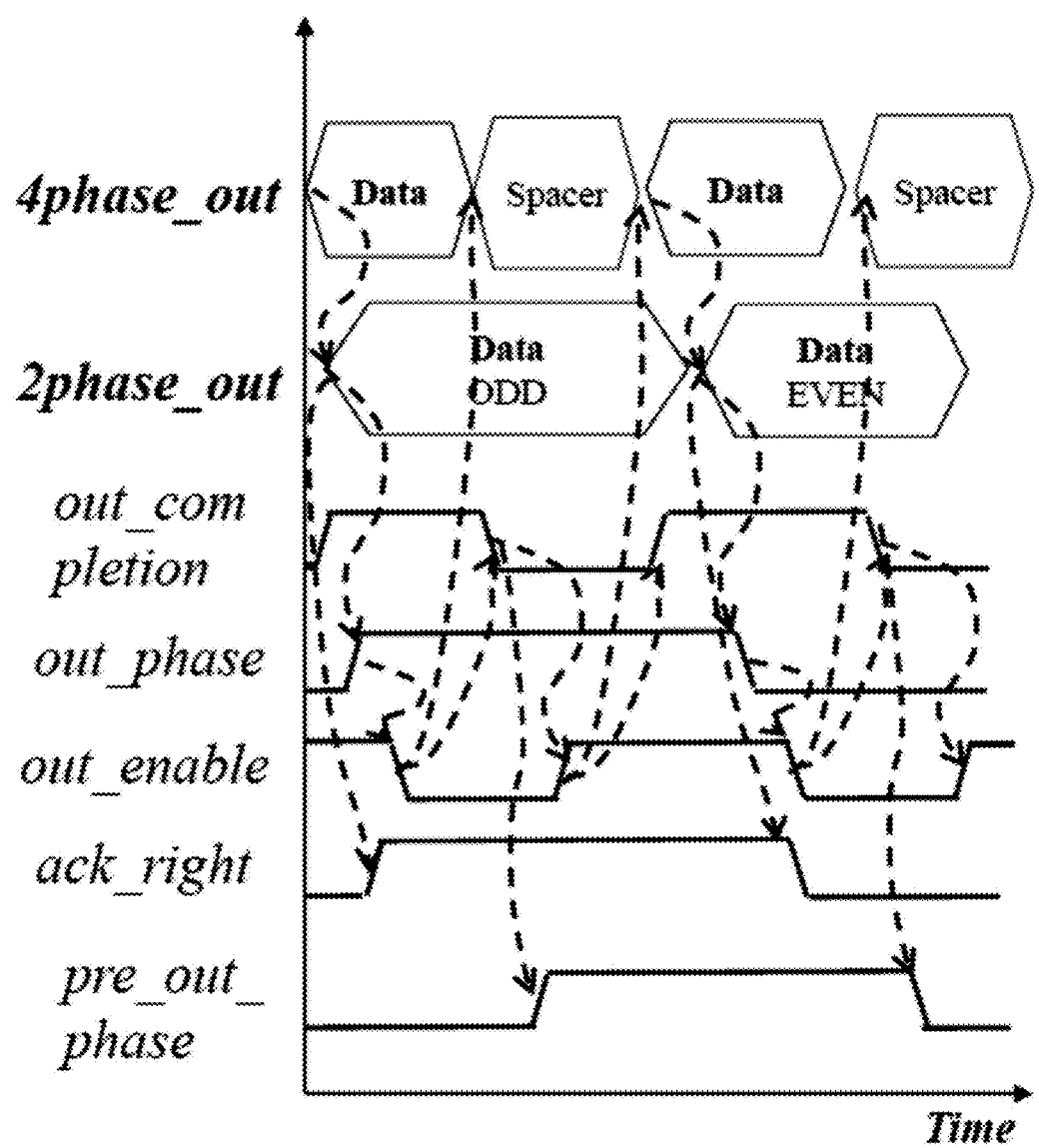

FIG. 12A is a circuit diagram illustrating the four-to-two-phase converter 13 and the output controller 15. FIG. 12A collectively illustrates the four-to-two-phase converter 13 shown in FIG. 1 and the output controller 15 shown in FIG. 11.

FIG. 12B is a time chart illustrating the operation of the four-to-two-phase converter 13. In FIG. 12B, the horizontal axis shows time (arbitrary unit) and the vertical axis shows, in an order from the above, the four-phase output signal (4phase_out), the two-phase output signal (2phase_out), the output completion signal (out_completion), the output phase signal (out_phase), the output enable signal (out_enable), the acknowledgement signal of the output side (ack_right), and the pre-output phase signal (pre out_phase).

As shown in FIG. 12B, when the output completion signal is high (High), the output phase signal (out_phase) passes the asynchronous D latch 15c. This stops the output enable signal (out_enable).

On the other hand, when the output completion signal is low (Low), the pre-output phase signal (pre out_phase) is the same as the output phase signal (out_phase). Then, the pre-output phase signal (pre_out_phase) is output, as shown in FIG. 12B, to the NOT circuit 18a of the four-phase decoder 18 for the next protocol conversion.

When the output acknowledgement signal (ack_right) changes due to a shift of the output phase signal (out_phase), then the output of the C element 15a shifts and the output enable signal (out_enable) is executed via the asynchronous D latch 15 and the XOR circuit 15d.

The above-described input enable signal (in_enable), the output enable signal (out_enable), and the pre-output phase signal (pre_out_phase) of the input controller 14 and the output controller 15 are generated only by the shift of the input signal. As a result, an advantage is caused that the asynchronous protocol converter 1 of the present invention is completely resistant against a timing of QDI operation.

As shown in FIG. 1, the asynchronous protocol converter 1 of the present invention is featured that the protocol conversion is independently performed by the input-side input controller 14 and the output-side output controller 15 of the four-phase router 12 having a pipelined structure.

The functional blocks 12a and 12c of the initial stage and the final stage of the four-phase pipelined router 12 are evaluated when the input enable signal (in_enable) and the output enable signal (out_enable) are high (High) and low (Low).

When the functional blocks 12a and 12c of the initial stage and the final stage of the four-phase pipelined router 12 are completed, then the input completion signal (in_completion) and the output completion signal (out_completion) are high (High). When the functional blocks 12a and 12c of the initial stage and the final stage of the four-phase pipelined router 12 are reset, then the input completion signal (in_completion) and the output completion signal (out_completion) are low (Low).

Figure 13:
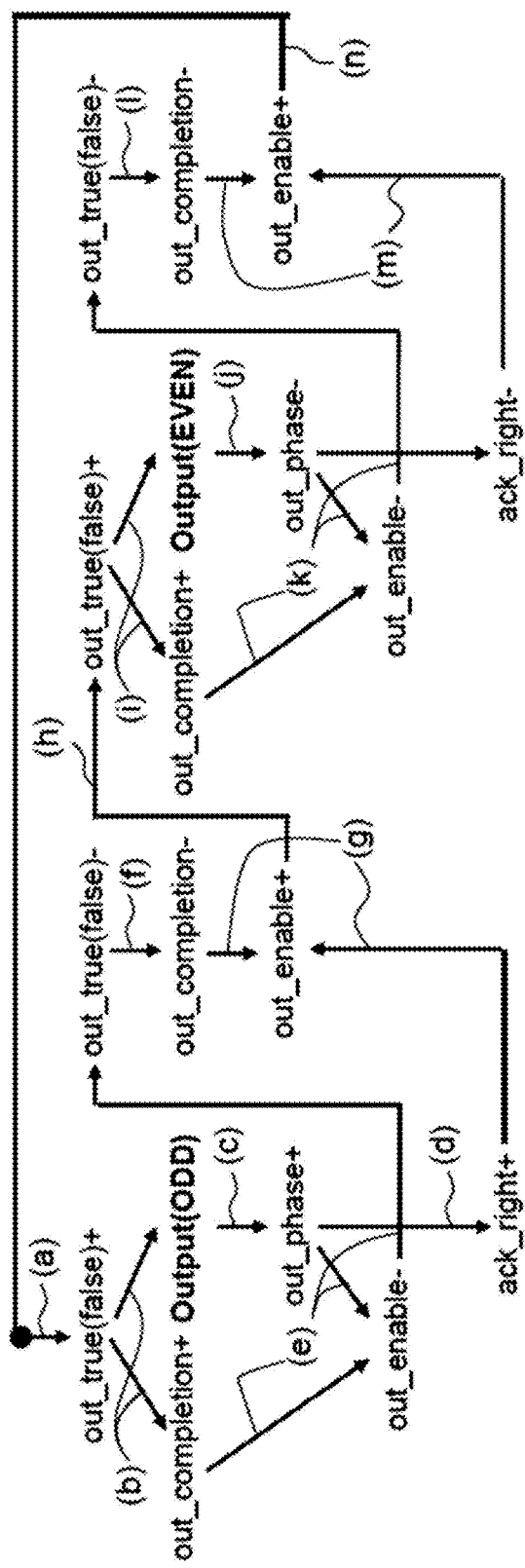
FIG. 13 is a state transition diagram illustrating the operation of the output controller.

FIG. 13 is a state transition diagram illustrating the operation of the output controller 15. As shown in FIG. 13, the output controller 15 operates to have a state transition as shown below.

(a) In the initial state, the signal out_true (false) rises and the status is high (High).

(b) When the signal out_true (false) rises, then the signal out_completion rises and the status is high (High) and the signal Output (ODD) is applied.

(c) When the signal Output (ODD) is input, then the signal out_phase rises and the status is high (High).

(d) When the signal out_phase rises, then the signal ark_right rises and the status is high (High).

(e) When the signal out_phase and the signal out_completion rise, then the signal out_enable falls and the status is low (Low). When the signal out_enable falls, the signal out_true (false) falls and the status is low (Low).

(f) When the signal out_true (false) falls, then the signal out_completion falls and the status is low (Low).

(g) When the signal out_completion falls and the signal ack_right rises, then the signal out_enable rises and the status is high (High).

(h) When the signal out_enable rises, the signal out_true (false) rises and the status is high (High).

(i) When the signal out_true (false) rises, the signal Output (EVEN) is output and the signal out_completion rises and the status is high (High).

(j) When the signal Output (EVEN) is output, then the signal out_phase falls and the status is low (Low).

(k) When the signal out_phase falls and the signal completion rises, then the signal out_enable falls and the status is low (Low). When the signal out_enable falls, the signal out_true (false) falls and the status is low (Low).

(l) When the signal out_true (false) falls, then the signal out_completion falls and the status is low (Low).

(m) When the signal out_completion falls and the signal ack_right falls, then the signal out_enable rises and the status is high (High).

(n) When the signal out_enable rises, then the signal out_true (false) rises and the status is high (High) and returns to the initial state.

Figure 14:
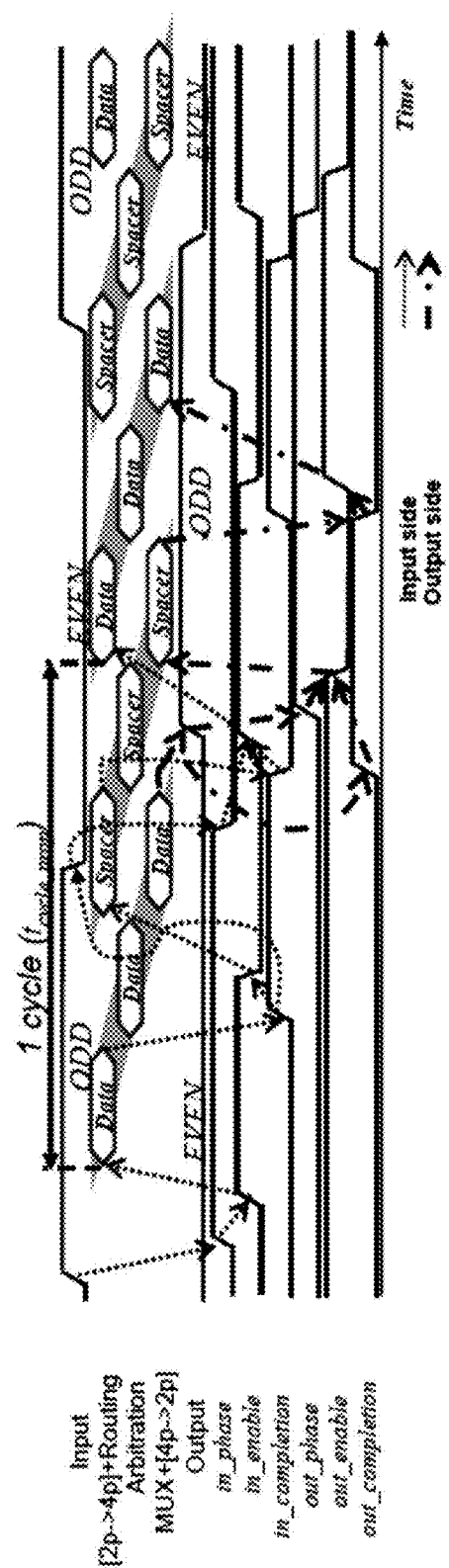
FIG. 14 is a time chart illustrating the operation of the asynchronous protocol converter of the present invention.

FIG. 14 is a time chart illustrating the operation of the asynchronous protocol converter 1 of the present invention. In FIG. 14, the horizontal axis shows time (arbitrary unit) and the vertical axis shows the waveforms of the respective parts. The waveform of the input side is shown by the solid line and the waveform of the output side is shown by the dashed line.

As shown in FIG. 14, the input side performs the following steps.

(1) When a new two-phase input having the phase information "odd" comes, then the input phase signal shifts and an input enable signal is executed.

(2) At the input side of the router having a pipelined structure, the two-to-four-phase protocol converter 11 generates the "data" for the four-phase protocol. Then, the four-phase router 12 performs the calculation at the functional block 12a of the initial stage (routing).

(3) After the calculation of the initial stage, the four-phase router 12 performs the calculation at the functional block (arbitration circuit) 12b of the second stage. At the same time, an input completion signal is executed (or asserted).

(4) After the execution (assertion) of the input completion signal, the input enable signal is stopped in order to generate a spacer so as to reset the four-phase input signal. Then, the two-phase signal of the next input is requested.

(5) When the functional block 12a of the initial stage of the four-phase pipelined router 12 is reset, the input completion signal is stopped. This means that the protocol conversion of the next two-phase input signal is prepared.

As shown in FIG. 14, the output side performs the following steps.

(1) In the output side of the four-phase router 12 having a pipelined structure, the computation of the four-phase router 12 is followed by the execution (assertion) of the output completion signal. Then, the four-to-two-phase converter 13 outputs a new two-phase signal having a phase signal of "odd" and stops the output enable signal.

(2) When the functional block 12a of the four-phase router is reset and the spacer stops the output enable signal, the output completion signal is executed (or asserted) for the next four-to-two-phase conversion.

Next, when a new two-phase input signal is input, the input side resets the functional block 12a of the initial stage in the four-phase router 12 and the encoding is started. On the other hand, when a new two-phase input signal is output, the output side resets the functional block 12c of the final stage in the four-phase router 12 and the decoding is started.

Next, the following section will describe the cycle time of the asynchronous protocol converter 1 of the present invention.

The cycle time ($t_{cycle\_invention}$) of the asynchronous protocol converter 1 of the present invention is the longer one of the delay time of the input side and the delay time of the output side. The delay time of the input side is caused by the two-to-four-phase protocol converter (2p->4p) 11, the functional block 12a ("data" and "spacer") of the initial stage of the four-phase router 12, and the input controller 14 ("data" and "spacer").

On the other hand, the delay time of the output side is caused by the four-to-two-phase protocol converter (4p->2p) 13, the functional block 12c ("data" and "spacer") of the final stage of the four-phase router 12, and the output controller 15 ("data" and "spacer").

Thus, the cycle time ($t_{cycle\_invention}$) of the asynchronous protocol converter 1 is obtained by the following equation (2).

[Equation 2]

$$t_{cycle\_invention} = t_{2p \to 4p}(t_{4p \to 2p}) + t_{fb\_data} + t_{fb\_spacer} + t_{Icont\_data}(t_{Ocont\_data}) + t_{Icont\_spacer}(t_{Ocont\_spacer}) \quad (2)$$

As can be seen from the formula (2), the cycle time ($t_{cycle\_invention}$) of the asynchronous protocol converter 1 does not depend on the number k of the stages of the pipelined circuit of the router.

Therefore, the cycle time of the asynchronous protocol converter 1 of the present invention operates at a higher speed than that of the conventional asynchronous protocol converter.

(Asynchronous Protocol Converter Having Multiple Inputs and Multiple Outputs)

Next, the following section will describe the asynchronous protocol converter of the present invention having multiple inputs and multiple outputs.

Figure 15:
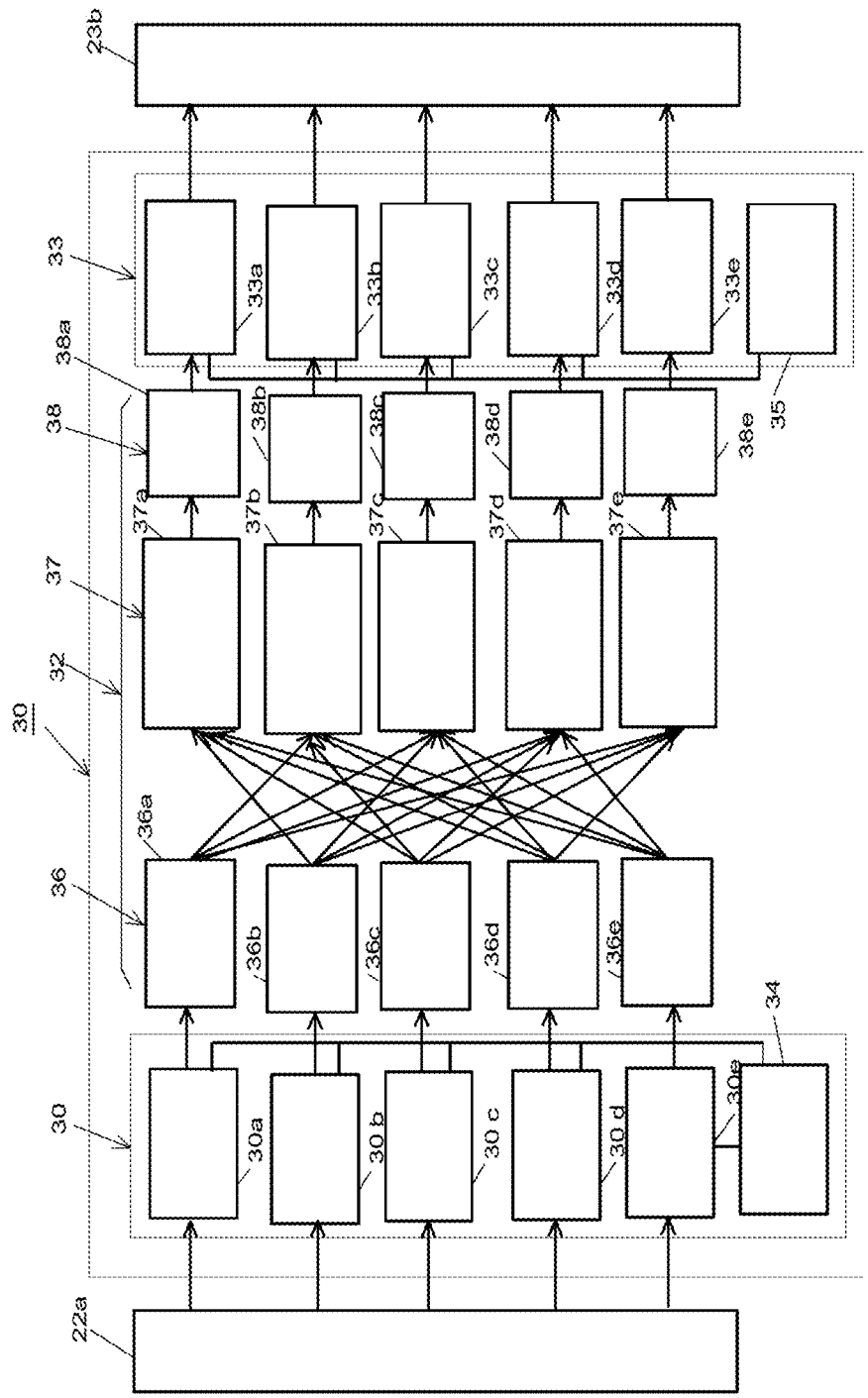
FIG. 15 is a block diagram illustrating the configuration of an asynchronous protocol converter with 5 inputs and 5 outputs.

FIG. 15 is a block diagram illustrating the configuration of the 5 inputs and 5 outputs asynchronous protocol converter 30. The 5-inputs and 5-outputs asynchronous protocol converter 30 is composed of: the two-to-four-phase converter 31 connected to the output of the router 22a shown in FIG. 2; the three stages configuration four-phase pipelined router 32 connected to the two-to-four-phase converter 31; the four-to-two-phase converter 33 connected to the three stages configuration four-phase pipelined router 32, the input controller 34, and the output controller 35.

The 5 inputs and 5 outputs asynchronous protocol converter 30 is composed of the respective asynchronous protocol converters 30a, 30a, 30b, 30c, 30d, and 30e. The asynchronous protocol converter 30a is composed of: the two-to-four-phase converter 31a; the three stages configuration four-phase pipelined router 32a connected to the two-to-four-phase converter 31a; the four-to-two-phase converter 33a connected to the three stages configuration four-phase pipelined router 32a; the respective input controllers 34 (not shown); and the respective output controllers 35 (not shown). The other asynchronous protocol converters from 30b to 39e also have the similar configuration to that of the asynchronous protocol converter 30a.

The respective asynchronous protocol converters 31a, 31b, 31c, 31d, and 31e of the asynchronous protocol converter 30 have the same configuration. The two-to-four-phase converter 31a has the same configuration as that of the two-to-four-phase converter 11 of the asynchronous protocol converter 1 described in FIG. 1 and performs the same operation. The input controller 34 has the same configuration as that of the input controller 14 of the asynchronous protocol converter 1 described in FIG. 1 and similarly performs the input control of the two-to-four-phase converter 31.

The three stages configuration pipelined router 32 is composed of: the routing circuit 36; the arbitration circuit 37 connected to the routing circuit 36; and the multiplexer circuit 38 connected to the arbitration circuit 37. The arbitration circuit 37 is also called an arbitration circuit. The three stages configuration pipelined router 32 is composed of the pipelined routers 32a, 32b, 32c, 32d, and 32e and has the same configuration each. The pipelined router 32a is composed of: the routing circuit 36a; the arbitration circuit 37a; and the multiplexer circuit 38a. Other pipelined routers 32b to 32e have the similar configuration to that of the pipelined router 32a.

The respective four-to-two-phase converters 33a, 33b, 33c, 33d, and 33e connected to the three stages configuration four-phase pipelined router 32 have the same configuration. The four-to-two-phase converter 33a has the same configuration as that of the four-to-two-phase converter 13 of the asynchronous protocol converter 1 described in FIG. 1 and performs the same operation. The output controller 35 has the same configuration as that of the output controller 15 of the asynchronous protocol converter 1 described in FIG. 1 and similarly performs the output control of the four-to-two-phase converter 33.

The following section will describe the operation of the asynchronous protocol converter with 5 inputs and 5 outputs 30.

The output from the two-to-four-phase converter 31a connected to the output of the router 22a is input to the routing circuit 36a. In the routing circuit 36a, a transfer destination is determined depending on the address of the input data. Thereafter, the input data is sent to any one of the respective arbitration circuits (i.e., arbitration circuits from 37a to 37e) having the corresponding address. When the input data and other pieces of input data have the same transfer destination, the arbitration circuit 37a arbitrates the priority (i.e., determines which of the former and the latter should be transferred). Thereafter, the input data is transferred to the respective multiplexer circuits from 38a to 38e connected to the respective arbitration circuits from 37a to 37e and is output to the four-to-two-phase converter 33. For example, the output from the four-to-two-phase converter 33a is output to any one input of the router 22b.

According to the asynchronous protocol converter with 5 inputs and 5 outputs 30, inputs and outputs independently operate in the asynchronous four-phase pipelined router 32. In FIG. 15, the example of the 5 inputs and 5 outputs asynchronous protocol converter 30 was shown. The respective asynchronous protocol converters 30a in the number of the inputs and outputs are required. In the case of FIG. 15, the five asynchronous protocol converters 30a to 30e are required. Specifically, in the case of "n" inputs and "n" outputs, the asynchronous protocol converters 30a in the number of "n" are required.

(Simulation of Asynchronous Protocol Converter 1)

For the asynchronous protocol converter 1 described with reference to FIG. 1, an integrated circuit was designed by the CMOS manufacture technique having the minimum feature size of 0.13 μm. This integrated circuit was simulated by HSPICE. The integrated circuit was set to have a power-supply voltage (Vdd) of 1.2V. In the simulation, the pipeline had 5 registers and data was processed based on the First In First Out (FIFO) method and the data bit was serially transferred.

Figure 16:
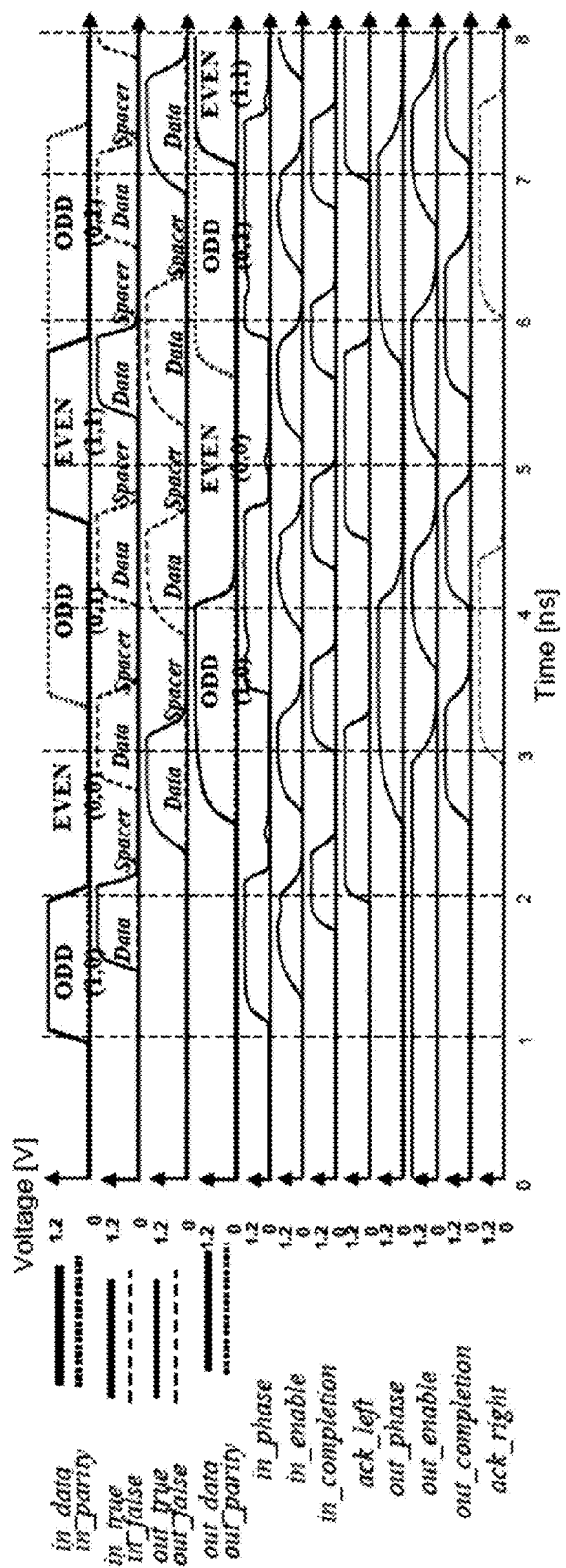
FIG. 16 illustrates an example of a time chart simulating the asynchronous protocol converter of the present invention.

FIG. 16 illustrates one example of the time chart simulating the asynchronous protocol converter 1. In FIG. 16, the horizontal axis shows time (ns) and the vertical axis shows, in an order from the above, the two-phase input data signal (in_data), the two-phase input parity signal (in_parity), the four-phase input true signal (in_true), the four-phase input false signal (in_false), the four-phase output true signal (out_true), the four-phase output false signal (out_false), the two-phase output data signal (out_data), the two-phase output parity signal (out_parity), the input phase signal (in_phase), the input enable signal (in_enable), the input completion signal (in_completion), the input side acknowledgement signal (ack_left), the output phase signal (out_phase), the output enable signal (out_enable), the output completion signal (out_completion), and the output side acknowledgement signal (ack_right), respectively.

As shown in FIG. 16, in the asynchronous protocol converter 1, the two-phase input signal is encoded by the input controller 14 prior to the decoding of the previous two-phase signal by the output controller 15. As a result, it was confirmed that, in the asynchronous protocol converter 1 of the present invention, the protocol conversion was independently processed by the input controller 14 and the output controller 15 provided at the front and rear sides of the four-phase pipelined circuit.

Simulation Example 1

Based on different number of pipeline registers, the asynchronous protocol converters 1 of the present invention and a comparative example were simulated. The asynchronous protocol converters of the present invention and the comparative example had 246 transistors and 217 transistors, respectively. Thus, the number of the transistors of the asynchronous protocol converter 1 of the present invention is 113% of that of the comparative example.

Figure 17:
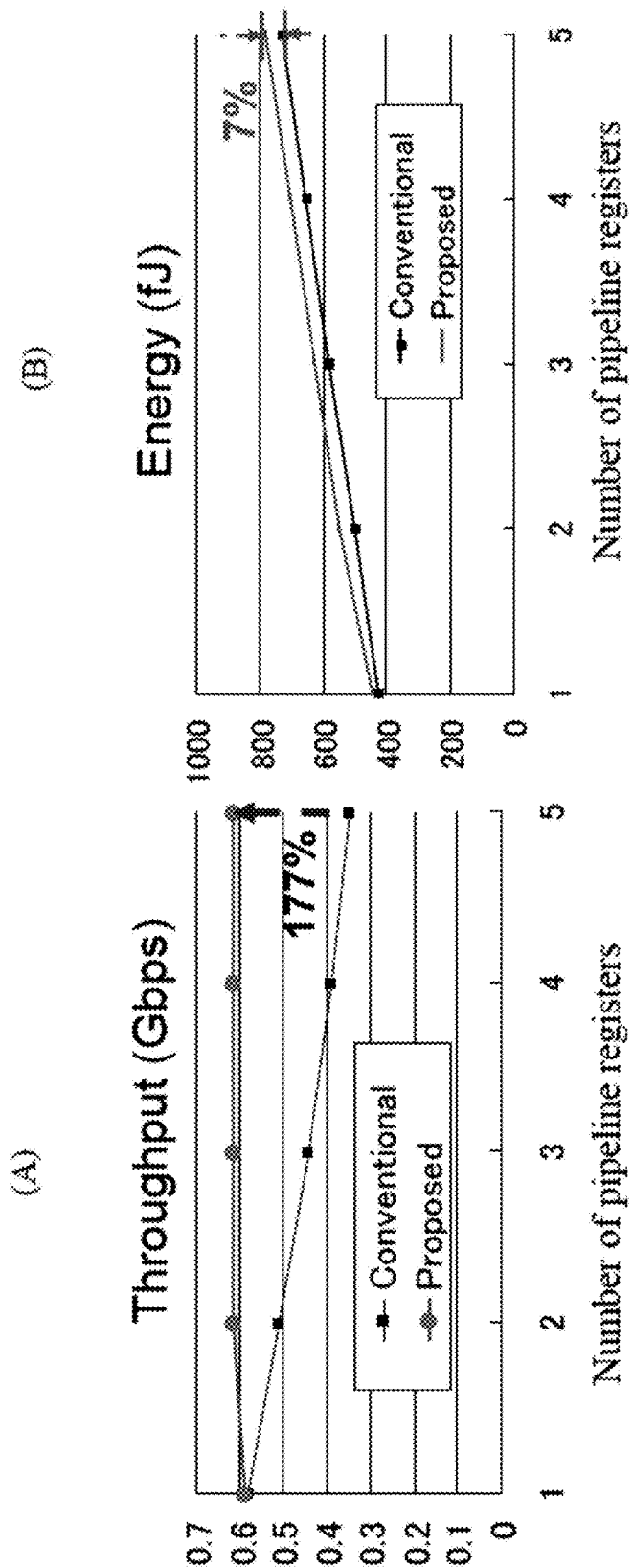
FIG. 17 illustrate the result of the simulation example 1, wherein (A) illustrates the relation between the number of pipeline registers and the throughput and (B) illustrates the relation between the number of pipeline registers and power consumption.

FIG. 17 shows the result of the simulation example 1, wherein (A) shows the relation between the number of pipeline registers and the throughput and (B) shows the relation between the number of the pipeline registers and the energy consumption. In FIGS. 17(A) and (B), the horizontal axis shows the number of the pipeline registers. In FIG. 17(A), the vertical axis shows the throughput. In FIG. 17(B), the vertical axis shows the energy consumption (fJ). The throughput is a data transfer rate (Gbps).

As shown in FIG. 17(A), the throughput of the asynchronous protocol converter 1 of the present invention does not depend on the number of the pipeline registers. The throughput of the comparative example declines with an increase of the number of the pipeline registers. When the number of the pipeline registers is 5, it was found that the throughput of the asynchronous protocol converter 1 of the present invention is 1.77 times higher than that of the comparative example.

As shown in FIG. 17(B), the energy consumption of the asynchronous protocol converters 1 of the present invention and the comparative example increased in proportion to the number of the pipeline registers. The energy consumption of the asynchronous protocol converter 1 of the present invention is only about 7% higher than the energy consumption of the comparative example.

As can be seen from the simulation example 1, it is obvious that the asynchronous protocol converter 1 of the present invention has, an improved throughput than that of the comparative example and has the energy consumption almost equal to that of the comparative example with an increase of the number of the pipeline registers.

Simulation Example 2

The asynchronous protocol converter 1 of the present invention was inserted between the two 10 bit four-phase routers and the simulation for realizing the two-phase transfer was performed. In the comparative example, the four-phase transfer circuit based on the conventional four-phase method was simulated. The conventional four-phase transfer circuit uses the four-phase protocol only.

The reason why the comparative example uses the conventional four-phase method is that the conventional asynchronous protocol converter cannot be applied to a multiple input and a multiple output router.

The asynchronous protocol converter 1 of the present invention and the four-phase transfer circuit of the comparative example had 71355 transistors and 61818 transistors, respectively. Thus, the number of the transistors of the asynchronous protocol converter 1 of the present invention is 115% of that of the comparative example.

Figure 18:
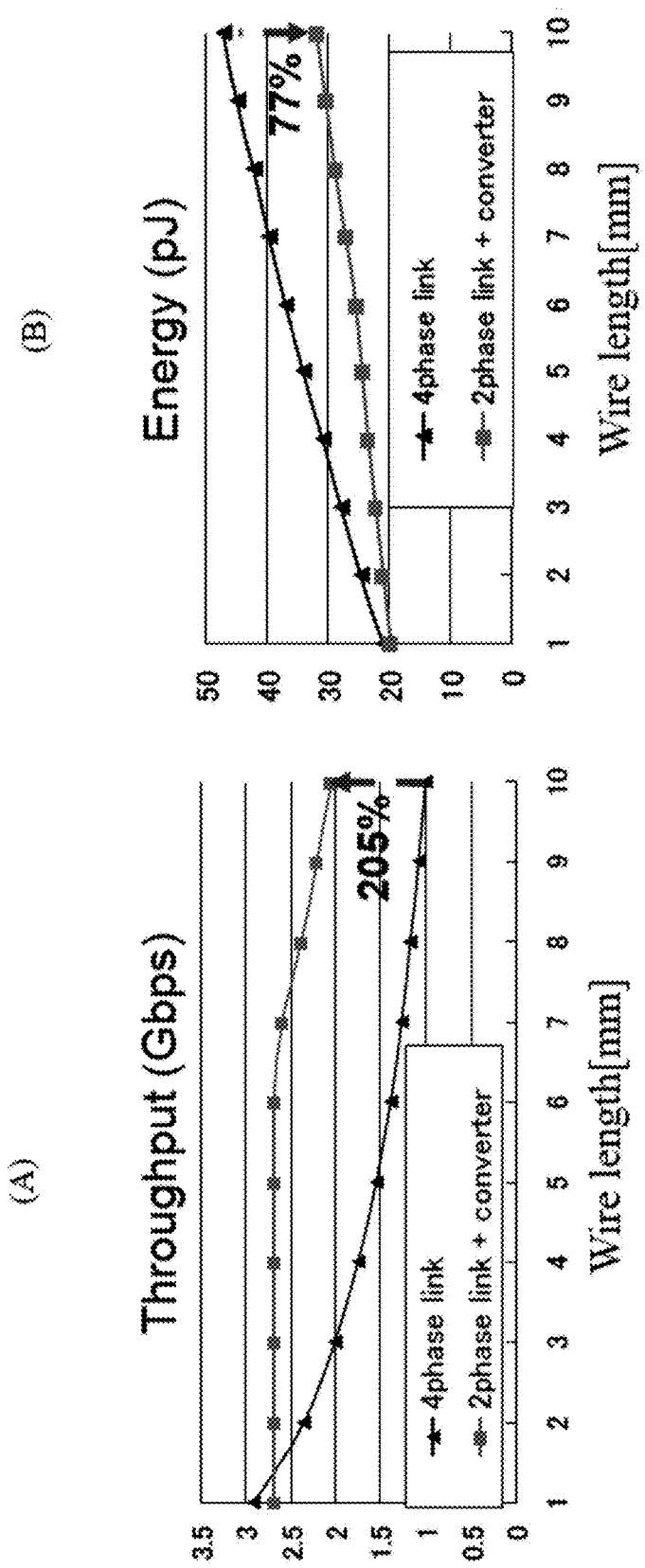
FIG. 18 illustrates the result of the simulation example 2, wherein (A) illustrates the relation between the wire length and the throughput and (B) illustrates the relation between the wire length and the power consumption.
Figure 19:
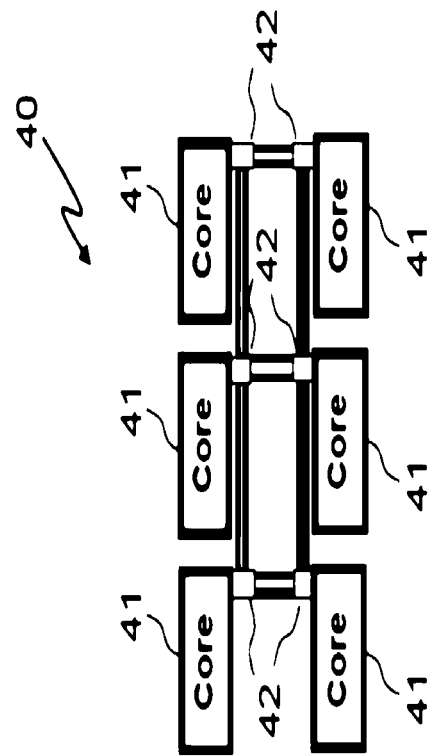
FIG. 19 is a block diagram illustrating the configuration of a conventional system LSI based on an NoC communication method.
Figure 20:
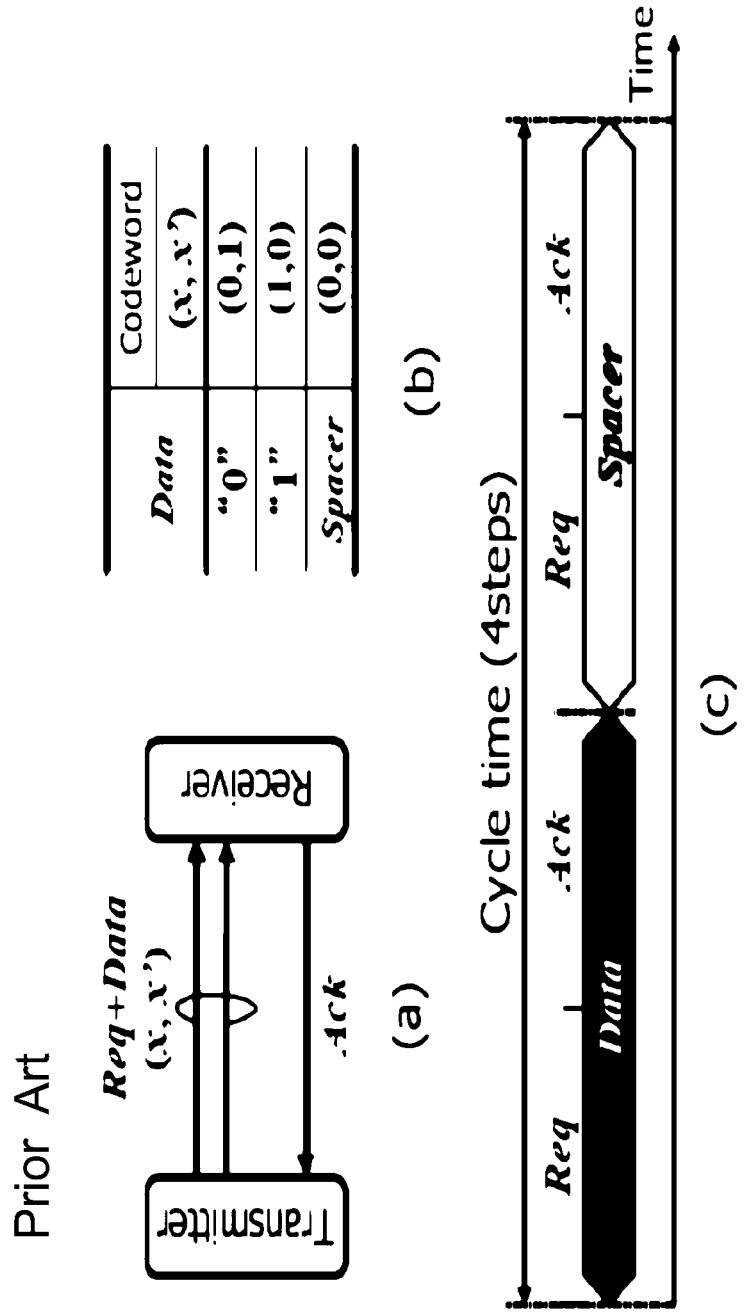
FIG. 20 illustrates a known four-phase dual-rail code, wherein (A) illustrates a channel model of the asynchronous data transfer based on the four-phase dual-rail encoding, (B) illustrates the definition of the code, and (C) illustrates the procedure of one data transfer in the transfer protocol based on the four-phase dual-rail encoding.
Figure 21:
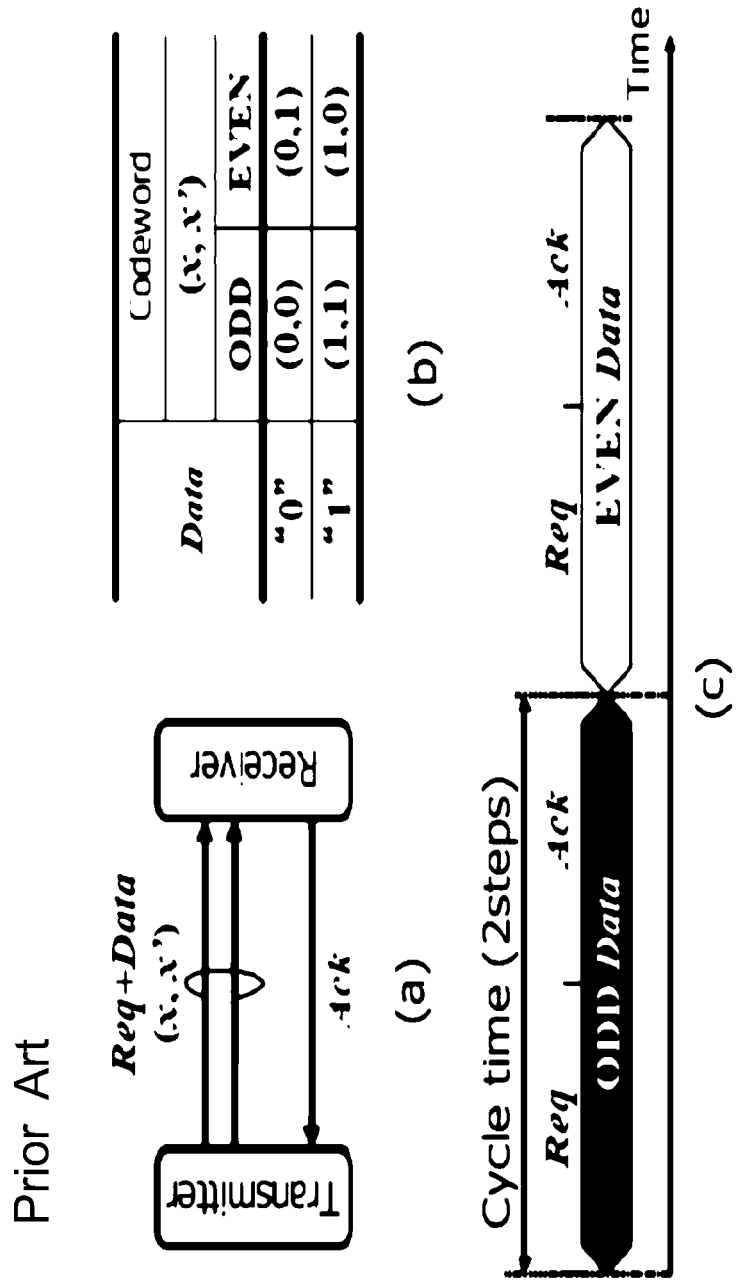
FIG. 21 illustrates a known two-phase dual-rail code, wherein (A) illustrates the channel model of the asynchronous data transfer based on the two-phase dual-rail encoding, (B) illustrates the definition of the code, and (C) illustrates the procedure of one data transfer in the transfer protocol based on the two-phase dual-rail encoding.
Figure 22:
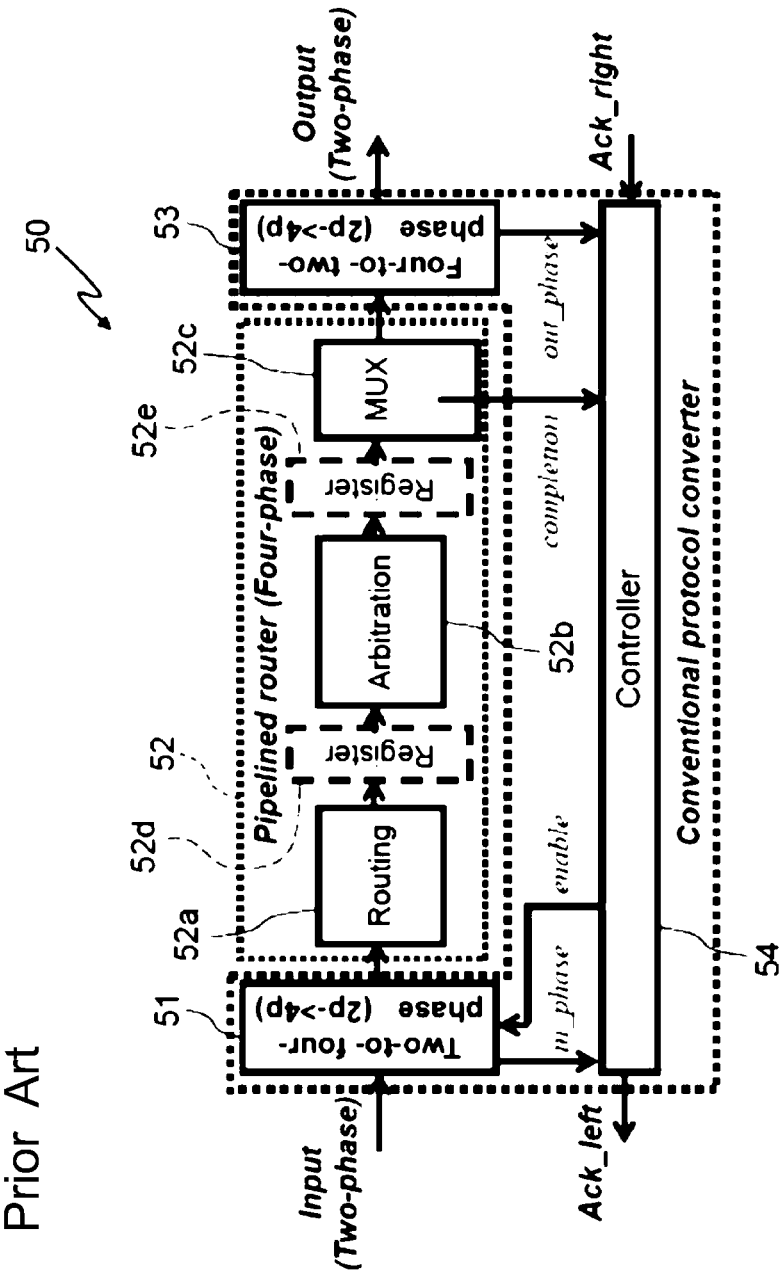
FIG. 22 is a block diagram illustrating the configuration of a conventional asynchronous protocol converter using a QDI logic method.
Figure 23:
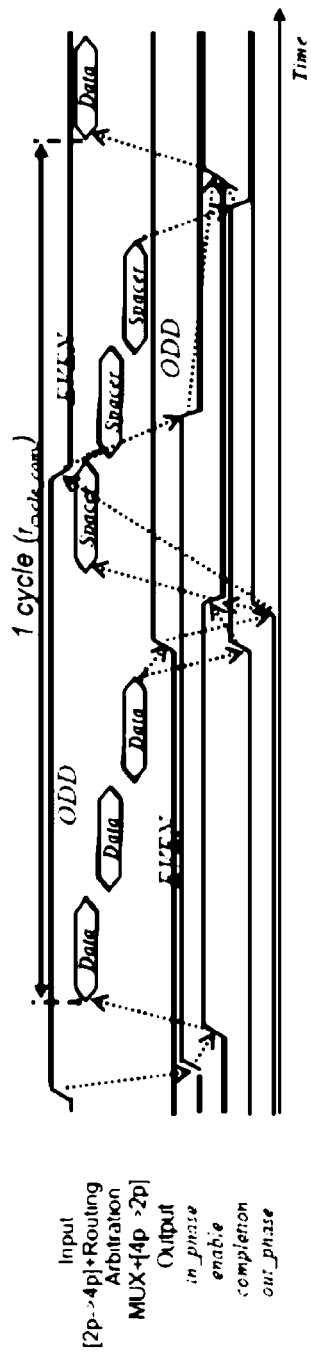
FIG. 23 is a timing chart illustrating the operation of the conventional asynchronous protocol converter using the QDI logic method.

FIG. 18 shows the result of the simulation example 2, wherein (A) shows the relation between the wire length and the throughput and (B) shows the relation between the wire length and the energy consumption. In FIGS. 18(A) and (B), the horizontal axis shows the wire length (mm). In FIG. 18(A), the vertical axis shows the throughput. In FIG. 18(B), the vertical axis shows the energy consumption (pJ).

As shown in FIG. 18(A), the throughput of the asynchronous protocol converter 1 of the present invention was substantially fixed until the wire length reached 7 mm and gradually declined when the wire length was 7 mm or more. The throughput of the comparative example declined with an increase of the wire length. It was found that, when the wire length was 10 mm, the throughput using the asynchronous protocol converter 1 of the present invention was 2.05 times higher than that of the comparative example.

As shown in FIG. 18(B), the energy consumption of the asynchronous protocol converters 1 of the present invention and the comparative example increases in proportion to the number of the pipeline registers. As can be seen, the energy consumption of the asynchronous protocol converter 1 of the present invention is lower than that of the comparative example. When the wire length was 10 mm, it was found that the energy consumption of the asynchronous protocol converter 1 of the present invention was 77% of that of the comparative example.

As can be seen from the simulation example 2, it is obvious that the asynchronous protocol converter 1 of the present invention has an improved throughput and a reduced energy consumption with an increase of the wire length in comparison with the comparative example.

Table 1 shows the summary of the result of the simulation.

asynchronous network on-chip for flexibly performing the communication among few dozens of IP cores. In the case of the conventional apparatus, the protocol conversion of the input and output was commonly performed, thus being limited to the use of a one input and one output arithmetic unit.

In contrast with this, the asynchronous protocol converter 1 of the present invention is composed of: the four-phase pipelined router 12 as an arithmetic unit; two independent input controllers 14 connected to the input/output port of the four-phase pipelined router 12; and the output controller 15. By this configuration, the input side performs the protocol conversion of the input data sent to the four-phase pipelined router 12 as a arithmetic unit. Then, the converted data in the arithmetic unit is acknowledged, thus completing the input side processing. On the other hand, the data in the arithmetic unit is acknowledged and the protocol conversion of the output data is performed, thus completing the output side processing.

As described above, the present invention can allow the protocol conversion to be independently performed in the input port and output port and thus can be used for a multiple inputs and multiple outputs arithmetic unit.

According to the asynchronous protocol converter 1 of the present invention, the protocol conversion can be independently performed in the input port and output port. Thus, the asynchronous protocol converter 1 of the present invention can be used for a multiple inputs and multiple outputs arithmetic unit. According to the result of the circuit simulation, the wiring delay time was about 55% of that of the conventional four-phase transfer circuit.

According to the present invention, such an apparatus is realized that provides the independent protocol conversions in the input side and the output side. Thus, the protocol converter can be applied to the router 22 having multiple inputs and multiple outputs. Thus, the router 22 and the data transfer link can use an optimal protocol. As a result, the data transfer link can use a protocol having a short latency time, thus providing a significantly improved transfer rate when the protocol is used in a network on-chip.

According to the system on-chip using the asynchronous protocol converter 1 of the present invention, an improved in-chip data communication rate can provide an increased number of processors that can be simultaneously driven. Furthermore, since the asynchronous protocol converter 1 is the asynchronous one not using a clock signal, the elimination of a circuit for generating a clock signal can provide power reduction, thus realizing a System on-Chip (SoC) having low power consumption and a high speed.

When the circuit size of the asynchronous protocol converter 1 of the present invention is compared with the circuit

TABLE 1

|  | The present invention | | | | | Comparative example | | | | |
| --- | --- | --- | --- | --- | --- | --- | --- | --- | --- | --- |
|  | The number of pipeline registers | | | | | | | | | |
|  | 1 | 2 | 3 | 4 | 5 | 1 | 2 | 3 | 4 | 5 |
| Cycle time (ns.) | 1.7 | 1.63 | 1.63 | 1.63 | 1.63 | 1.72 | 1.96 | 2.27 | 2.58 | 2.89 |
| Power (μW) | 261 | 226 | 384 | 431 | 480 | 246 | 255 | 255 | 254 | 252 |
| Energy (fJ) | 444 | 548 | 626 | 703 | 782 | 423 | 500 | 579 | 655 | 728 |

According to the present invention, a protocol converter is provided between a router and a data transfer link in an sizes of the four-phase transfer circuit and the two-phase transfer circuit based on the conventional method, the relation of 100:250:115 is established among the conventional four-phase transfer circuit (that is assumed to have a circuit size of 100), the conventional two-phase transfer circuit, and the asynchronous protocol converter 1 of the present invention. Thus, the circuit size of the asynchronous protocol converter 1 of the present invention is similar to the circuit size of the four-phase transfer circuit of the conventional method and can realize the asynchronous protocol converter 1 having a higher throughput than that of the four-phase transfer circuit of the conventional method.

The asynchronous communication method among a plurality of processing functional blocks in the system LSI or NoC is classified to the four-phase method and the two-phase method. The asynchronous protocol converter of the present invention is a new method combining the advantages of the four-phase and two-phase methods and also can be used for an Application Specific Integrated Circuit (ASIC).

The present invention is not limited to the above embodiments. Various modifications can be made within the scope of the invention described in claims and such modifications are also covered by the scope of the present invention.

What is claimed is:

1. An asynchronous protocol converter provided between neighboring routers in an LSI (Large Scale Integrated circuit) including a plurality of IP cores and a router provided adjacent to the plurality of IP cores, comprising:
    a two-to-four-phase converter connected to the neighboring router in the LSI;
    a four-phase pipelined router connected to the output side of the two-to-four-phase converter;
    a four-to-two-phase converter connected to an output of the four-phase pipelined router;
    an input controller for controlling the two-to-four-phase converter; and
    an output controller for controlling the four-to-two-phase converter,
    wherein in the input controller, an input phase signal (in_phase) is input from the two-to-four-phase converter; an input enable signal (in_enable) is output to the two-to-four-phase converter; an input completion signal (in_completion) is input from the four-phase pipelined router,
    wherein in the output controller, an output completion signal (out_completion) is input from the four-phase pipelined router; an output enable signal (out_enable) is output to the four-phase pipelined router; an output phase signal (out_phase) is input from the four-to-two-phase converter; a pre-output phase signal (pre_out_phase) is output to the four-to-two-phase converter, and
    wherein protocol conversions from the two-to-four-phase and the four-to-two-phase are independently performed by the input controller and the output controller.

2. An asynchronous protocol converter provided between neighboring routers in an LSI (Large Scale Integrated circuit) including a plurality of IP cores and a router provided adjacent to the plurality of IP cores, comprising:
    a two-to-four-phase converter connected to the neighboring router in the LSI;
    a four-phase pipelined router connected to the output side of the two-to-four-phase converter;
    a four-to-two-phase converter connected to an output of the four-phase pipelined router;
    an input controller for controlling the two-to-four-phase converter; and
    an output controller for controlling the four-to-two-phase converter,
    wherein the two-to-four-phase converter is comprised: a two-phase completion detector connected to the router; and a four-phase encoder for receiving an output from the two-phase completion detector, and
    the four-to-two-phase converter is comprised: a four-phase decoder connected to the output of the four-phase pipelined router; and a two-phase completion detector for receiving an output from the four-phase decoder,
    wherein in the input controller, an input phase signal (in_phase) is input from the two-to-four-phase converter; an input enable signal (in_enable) is output to the two-to-four-phase converter; an input completion signal (in_completion) is input from the four-phase pipelined router,
    wherein in the output controller, an output completion signal (out_completion) is input from the four-phase pipelined router; an output enable signal (out_enable) is output to the four-phase pipelined router; an output phase signal (out_phase) is input from the four-to-two-phase converter; a pre-output phase signal (pre_out_phase) is output to the four-to-two-phase converter, and
    wherein protocol conversions from the two-to-four-phase and the four-to-two-phase are independently performed by the input controller and the output controller.

3. The asynchronous protocol converter according to claim 1 or 2, wherein the input controller has the following state transitions:
    (a) in the initial status, the status of signal in_phase is high (High), and similarly, the status of signal in_completion is low (Low);
    (b) the signal in_enable rises and the status is high (High);
    (c) when the signal in_enable rises, then the signal in_true (false) showing true ("1") or false ("0") rises and the status is high (High);
    (d) when the signal in_true (false) is input, then the signal in_completion rises and the status is high (High);
    (e) when the signal in_completion rises, then the signal ack_left rises and the status is high (High);
    (f) when the signal ack_left rises, then signal in_enable falls and the status is low (Low) and the signal Input (EVEN) is input;
    (g) when the signal in_enable falls, then the signal in_true (false) falls and the status is low (Low);
    (h) when the signal in true (false) falls, the signal in_completion falls and the status is low (Low);
    (i) when the signal Input (EVEN) is input, then the signal in_phase falls and the status is low (Low);
    (j) when the signal in_phase falls and the signal in_completion falls, then signal in_enable rises and the status is high (High);
    (k) when the signal in_enable rises, then the signal in true (false) rises and the status is high (High);
    (l) when the signal in_true (false) rises, then the signal_in completion rises and the status is high (High);
    (m) when the signal_in completion rises, then the signal ack_left falls and the status is low (Low);
    (n) when the signal ack_left falls, then the signal in_enable falls and the status is low (Low) and the signal Input (ODD) is input;
    (o) when the signal Input (ODD) is input, then the signal in_phase rises and the status is high (High) and returns to the initial status;
    (p) when the signal in_enable falls, then the signal in_true (false) falls and the status is low (Low); and
    (q) when the signal in_true (false) falls, then the signal_in completion falls and the status is low (Low) and returns to the initial status.

4. The asynchronous protocol converter according to claim 3, wherein the input controller is comprised of an asynchronous D latch and an XOR circuit.

5. The asynchronous protocol converter according to claim 1 or 2, wherein the output controller has the following state transitions:
   (a) in the initial status, the signal out_true (false) rises and the status is high (High);
   (b) when the signal out_true (false) rises, then the signal out_completion rises and the status is high (High) and the signal Output (ODD) is applied;
   (c) when the signal Output (ODD) is input, then the signal out_phase rises and the status is high (High);
   (d) when the signal out_phase rises, then the signal ark_right rises and the status is high (High);
   (e) when the signal out_phase and the signal out_completion rise, then the signal out_enable falls and the status is low (Low) and, when the signal out_enable falls, then the signal out_true (false) falls and the status is low (Low);
   (f) when the signal out_true (false) falls, then the signal out_completion falls and the status is low (Low);
   (g) when the signal out_completion falls and when the signal ack_right rises, then the signal out_enable rises and the status is high (High);
   (h) when the signal out_enable rises, then the signal out true(false) rises and the status is high (High);
   (i) when the signal out_true(false) rises, then the signal Output (EVEN) is output and the signal out_completion rises and the status is high (High);
   (j) when the signal Output (EVEN) is output, then the signal out_phase falls and the status is low (Low);
   (k) when the signal out_phase falls and when the signal out_completion rises, then the signal out_enable falls and the status is low (Low) and, when the signal out_enable falls, then the signal out_true (false) falls and the status is low (Low);
   (l) when the signal out true(false) falls, then the signal out_completion falls and the status is low (Low);
   (m) when the signal out_completion falls and the signal ack_right falls, then the signal out_enable rises and the status is high (High); and
   (n) when the signal out_enable rises, then the signal out true (false) rises and the status is high (High) and returns to the initial status.

6. The asynchronous protocol converter according to claim 5, wherein the output controller is comprised of an asynchronous D latch, an XOR circuit gate, and a C element.

7. The asynchronous protocol converter according to claim 1 or 2, wherein the four-phase pipelined router is configured to comprise: a four-phase functional block; a pipeline register; and a four-phase completion detector.

8. The asynchronous protocol converter according to claim 1 or 2, wherein the four-phase pipelined router is configured to comprise: a routing circuit; an arbitration circuit connected to the routing circuit; and a multiplexer circuit connected to the arbitration circuit.

9. An asynchronous protocol converter provided between neighboring routers in an LSI (Large Scale Integrated circuit) including a plurality of IP cores and a router provided adjacent to the plurality of IP cores, comprising:
   a two-to-four-phase converter connected to the neighboring router in the LSI;
   a four-phase pipelined router connected to the output side of the two-to-four-phase converter;
   a four-to-two-phase converter connected to an output of the four-phase pipelined router;
   an input controller for controlling the two-to-four-phase converter; and
   an output controller for controlling the four-to-two-phase converter,
   wherein the input controller has the following state transitions:
   (a) in the initial status, the status of signal in_phase is high (High), and similarly, the status of signal in_completion is low (Low);
   (b) the signal in_enable rises and the status is high (High);
   (c) when the signal in_enable rises, then the signal in_true (false) showing true ("1") or false ("0") rises and the status is high (High);
   (d) when the signal in_true (false) is input, then the signal in_completion rises and the status is high (High);
   (e) when the signal in_completion rises, then the signal ack_left rises and the status is high (High);
   (f) when the signal ack_left rises, then signal in_enable falls and the status is low (Low) and the signal Input (EVEN) is input;
   (g) when the signal in_enable falls, then the signal in_true (false) falls and the status is low (Low);
   (h) when the signal in_true (false) falls, the signal in_completion falls and the status is low (Low);
   (i) when the signal Input (EVEN) is input, then the signal in_phase falls and the status is low (Low);
   (j) when the signal in_phase falls and the signal in_completion falls, then signal in_enable rises and the status is high (High);
   (k) when the signal in_enable rises, then the signal in_true (false) rises and the status is high (High);
   (l) when the signal in_true (false) rises, then the signal_in completion rises and the status is high (High);
   (m) when the signal_in completion rises, then the signal ack_left falls and the status is low (Low);
   (n) when the signal ack_left falls, then the signal in_enable falls and the status is low (Low) and the signal Input (ODD) is input;
   (o) when the signal Input (ODD) is input, then the signal in_phase rises and the status is high (High) and returns to the initial status;
   (p) when the signal in_enable falls, then the signal in_true (false) falls and the status is low (Low); and
   (q) when the signal in_true (false) falls, then the signal_in completion falls and the status is low (Low) and returns to the initial status, and
   wherein the output controller has the following state transitions:
   (a) in the initial status, the signal out_true (false) rises and the status is high (High);
   (b) when the signal out_true (false) rises, then the signal out_completion rises and the status is high (High) and the signal Output (ODD) is applied;
   (c) when the signal Output (ODD) is input, then the signal out_phase rises and the status is high (High);
   (d) when the signal out_phase rises, then the signal ark_right rises and the status is high (High);
   (e) when the signal out_phase and the signal out_completion rise, then the signal out_enable falls and the status is low (Low) and, when the signal out_enable falls, then the signal out_true (false) falls and the status is low (Low);
   (f) when the signal out_true (false) falls, then the signal out_completion falls and the status is low (Low);
   (g) when the signal out_completion falls and when the signal ack_right rises, then the signal out_enable rises and the status is high (High);

(h) when the signal out_enable rises, then the signal out_true(false) rises and the status is high (High);
(i) when the signal out_true(false) rises, then the signal Output (EVEN) is output and the signal out_completion rises and the status is high (High);
(j) when the signal Output (EVEN) is output, then the signal out_phase falls and the status is low (Low);
(k) when the signal out_phase falls and when the signal out_completion rises, then the signal out_enable falls and the status is low (Low) and, when the signal out_enable falls, then the signal out_true (false) falls and the status is low (Low);
(l) when the signal out_true(false) falls, then the signal out_completion falls and the status is low (Low);
(m) when the signal out_completion falls and the signal ack_right falls, then the signal out_enable rises and the status is high (High); and
(n) when the signal out_enable rises, then the signal out_true (false) rises and the status is high (High) and returns to the initial status.

10. An asynchronous protocol converter provided between neighboring routers in an LSI (Large Scale Integrated circuit) including a plurality of IP cores and a router provided adjacent to the plurality of IP cores, comprising:
a two-to-four-phase converter connected to the neighboring router in the LSI;
a four-phase pipelined router connected to the output side of the two-to-four-phase converter;
a four-to-two-phase converter connected to an output of the four-phase pipelined router;
an input controller for controlling the two-to-four-phase converter; and
an output controller for controlling the four-to-two-phase converter,
wherein the two-to-four-phase converter is comprised: a two-phase completion detector connected to the router; and a four-phase encoder for receiving an output from the two-phase completion detector, and
the four-to-two-phase converter is comprised: a four-phase decoder connected to the output of the four-phase pipelined router; and a two-phase completion detector for receiving an output from the four-phase decoder,
wherein the input controller has the following state transitions:
(a) in the initial status, the status of signal in_phase is high (High), and similarly, the status of signal in_completion is low (Low);
(b) the signal in_enable rises and the status is high (High);
(c) when the signal in_enable rises, then the signal in_true (false) showing true ("1") or false ("0") rises and the status is high (High);
(d) when the signal in_true (false) is input, then the signal in_completion rises and the status is high (High);
(e) when the signal in_completion rises, then the signal ack_left rises and the status is high (High);
(f) when the signal ack_left rises, then signal in_enable falls and the status is low (Low) and the signal Input (EVEN) is input;
(g) when the signal in_enable falls, then the signal in_true (false) falls and the status is low (Low);
(h) when the signal in_true (false) falls, the signal in_completion falls and the status is low (Low);
(i) when the signal Input (EVEN) is input, then the signal in_phase falls and the status is low (Low);
(j) when the signal in_phase falls and the signal in_completion falls, then signal in_enable rises and the status is high (High);
(k) when the signal in_enable rises, then the signal in_true (false) rises and the status is high (High);
(l) when the signal in_true (false) rises, then the signal_in completion rises and the status is high (High);
(m) when the signal_in completion rises, then the signal ack_left falls and the status is low (Low);
(n) when the signal ack_left falls, then the signal in_enable falls and the status is low (Low) and the signal Input (ODD) is input;
(o) when the signal Input (ODD) is input, then the signal in_phase rises and the status is high (High) and returns to the initial status;
(p) when the signal in_enable falls, then the signal in_true (false) falls and the status is low (Low); and
(q) when the signal in_true (false) falls, then the signal_in completion falls and the status is low (Low) and returns to the initial status, and
wherein the output controller has the following state transitions:
(a) in the initial status, the signal out_true (false) rises and the status is high (High);
(b) when the signal out_true (false) rises, then the signal out_completion rises and the status is high (High) and the signal Output (ODD) is applied;
(c) when the signal Output (ODD) is input, then the signal out_phase rises and the status is high (High);
(d) when the signal out_phase rises, then the signal ark_right rises and the status is high (High);
(e) when the signal out_phase and the signal out_completion rise, then the signal out_enable falls and the status is low (Low) and, when the signal out_enable falls, then the signal out_true (false) falls and the status is low (Low);
(f) when the signal out_true (false) falls, then the signal out_completion falls and the status is low (Low);
(g) when the signal out_completion falls and when the signal ack_right rises, then the signal out_enable rises and the status is high (High);
(h) when the signal out_enable rises, then the signal out_true (false) rises and the status is high (High);
(i) when the signal out_true (false) rises, then the signal Output (EVEN) is output and the signal out_completion rises and the status is high (High);
(j) when the signal Output (EVEN) is output, then the signal out_phase falls and the status is low (Low);
(k) when the signal out_phase falls and when the signal out_completion rises, then the signal out_enable falls and the status is low (Low) and, when the signal out_enable falls, then the signal out_true (false) falls and the status is low (Low);
(l) when the signal out_true (false) falls, then the signal out_completion falls and the status is low (Low);
(m) when the signal out_completion falls and the signal ack_right falls, then the signal out_enable rises and the status is high (High); and
(n) when the signal out_enable rises, then the signal out_true (false) rises and the status is high (High) and returns to the initial status.

11. The asynchronous protocol converter according to claim 9 or 10, wherein the input controller is comprised of an asynchronous D latch and an XOR circuit.

12. The asynchronous protocol converter according to claim 9 or 10, wherein the output controller is comprised of an asynchronous D latch, an XOR circuit gate, and a C element.

13. The asynchronous protocol converter according to claim 9 or 10, wherein the four-phase pipelined router is configured to comprise: a four-phase functional block; a pipeline register; and a four-phase completion detector.

14. The asynchronous protocol converter according to claim 9 or 10, wherein the four-phase pipelined router is configured to comprise: a routing circuit; an arbitration circuit connected to the routing circuit; and a multiplexer circuit connected to the arbitration circuit.

15. An asynchronous protocol converter provided between neighboring routers in an LSI (Large Scale Integrated circuit) including a plurality of IP cores and a router provided adjacent to the plurality of IP cores, comprising:
  a two-to-four-phase converter connected to the neighboring router in the LSI;
  a four-phase pipelined router connected to the output side of the two-to-four-phase converter;
  a four-to-two-phase converter connected to an output of the four-phase pipelined router;
  an input controller for controlling the two-to-four-phase converter; and
  an output controller for controlling the four-to-two-phase converter,
  wherein the input controller is comprised of an asynchronous D latch and an XOR circuit, and
  wherein the output controller is comprised of an asynchronous D latch, an XOR circuit gate, and a C element.

16. An asynchronous protocol converter provided between neighboring routers in an LSI (Large Scale Integrated circuit) including a plurality of IP cores and a router provided adjacent to the plurality of IP cores, comprising:
  a two-to-four-phase converter connected to the neighboring router in the LSI;
  a four-phase pipelined router connected to the output side of the two-to-four-phase converter;
  a four-to-two-phase converter connected to an output of the four-phase pipelined router;
  an input controller for controlling the two-to-four-phase converter; and
  an output controller for controlling the four-to-two-phase converter,
  wherein the two-to-four-phase converter is comprised: a two-phase completion detector connected to the router; and a four-phase encoder for receiving an output from the two-phase completion detector, and
  the four-to-two-phase converter is comprised: a four-phase decoder connected to the output of the four-phase pipelined router; and a two-phase completion detector for receiving an output from the four-phase decoder,
  wherein the input controller is comprised of an asynchronous D latch and an XOR circuit, and
  wherein the output controller is comprised of an asynchronous D latch, an XOR circuit gate, and a C element.

17. The asynchronous protocol converter according to claim 15 or 16, wherein the input controller has the following state transitions:
  (a) in the initial status, the status of signal in_phase is high (High), and similarly, the status of signal in_completion is low (Low);
  (b) the signal in_enable rises and the status is high (High);
  (c) when the signal in_enable rises, then the signal in_true (false) showing true ("1") or false ("0") rises and the status is high (High);
  (d) when the signal in_true (false) is input, then the signal in_completion rises and the status is high (High);
  (e) when the signal in_completion rises, then the signal ack_left rises and the status is high (High);
  (f) when the signal ack_left rises, then signal in_enable falls and the status is low (Low) and the signal Input (EVEN) is input;
  (g) when the signal in_enable falls, then the signal in_true (false) falls and the status is low (Low);
  (h) when the signal in_true (false) falls, the signal in_completion falls and the status is low (Low);
  (i) when the signal Input (EVEN) is input, then the signal in_phase falls and the status is low (Low);
  (j) when the signal in_phase falls and the signal in_completion falls, then signal in_enable rises and the status is high (High);
  (k) when the signal in_enable rises, then the signal in_true (false) rises and the status is high (High);
  (l) when the signal in_true (false) rises, then the signal_in completion rises and the status is high (High);
  (m) when the signal_in completion rises, then the signal ack_left falls and the status is low (Low);
  (n) when the signal ack_left falls, then the signal in_enable falls and the status is low (Low) and the signal Input (ODD) is input;
  (o) when the signal Input (ODD) is input, then the signal in_phase rises and the status is high (High) and returns to the initial status;
  (p) when the signal in_enable falls, then the signal in_true (false) falls and the status is low (Low); and
  (q) when the signal in_true (false) falls, then the signal_in completion falls and the status is low (Low) and returns to the initial status.

18. The asynchronous protocol converter according to claim 15 or 16, wherein the output controller has the following state transitions:
  (a) in the initial status, the signal out_true (false) rises and the status is high (High);
  (b) when the signal out_true (false) rises, then the signal out_completion rises and the status is high (High) and the signal Output (ODD) is applied;
  (c) when the signal Output (ODD) is input, then the signal out_phase rises and the status is high (High);
  (d) when the signal out_phase rises, then the signal ark_right rises and the status is high (High);
  (e) when the signal out_phase and the signal out_completion rise, then the signal out_enable falls and the status is low (Low) and, when the signal out_enable falls, then the signal out_true (false) falls and the status is low (Low);
  (f) when the signal out_true (false) falls, then the signal out_completion falls and the status is low (Low);
  (g) when the signal out_completion falls and when the signal ack_right rises, then the signal out_enable rises and the status is high (High);
  (h) when the signal out_enable rises, then the signal out_true (false) rises and the status is high (High);
  (i) when the signal out_true (false) rises, then the signal Output (EVEN) is output and the signal out_completion rises and the status is high (High);
  (j) when the signal Output (EVEN) is output, then the signal out_phase falls and the status is low (Low);
  (k) when the signal out_phase falls and when the signal out_completion rises, then the signal out_enable falls and the status is low (Low) and, when the signal out_enable falls, then the signal out_true (false) falls and the status is low (Low);
  (l) when the signal out_true (false) falls, then the signal out_completion falls and the status is low (Low);

(m) when the signal out_completion falls and the signal ack_right falls, then the signal out_enable rises and the status is high (High); and (n) when the signal out_enable rises, then the signal out_true (false) rises and the status is high (High) and returns to the initial status.

19. The asynchronous protocol converter according to claim 15 or 16, wherein the four-phase pipelined router is configured to comprise: a four-phase functional block; a pipeline register; and a four-phase completion detector.

20. The asynchronous protocol converter according to claim 15 or 16, wherein the four-phase pipelined router is configured to comprise: a routing circuit; an arbitration circuit connected to the routing circuit; and a multiplexer circuit connected to the arbitration circuit.

\* \* \* \* \*